(12) United States Patent
Breen et al.

(10) Patent No.: US 8,746,029 B2
(45) Date of Patent: Jun. 10, 2014

(54) GAS SPRING MOUNTING ASSEMBLY AND METHOD FOR METAL FORMING DIES

(75) Inventors: Scott M. Breen, Marne, MI (US); Joel T. Pyper, Grand Rapids, MI (US)

(73) Assignee: Standard Lifters, Inc., Grand Rapids, MI (US)

( * ) Notice: Subject to any disclaimer, the term of this patent is extended or adjusted under 35 U.S.C. 154(b) by 331 days.

(21) Appl. No.: 13/331,167

(22) Filed: Dec. 20, 2011

(65) Prior Publication Data

US 2012/0151985 A1 Jun. 21, 2012

Related U.S. Application Data

(60) Provisional application No. 61/425,372, filed on Dec. 21, 2010.

(51) Int. Cl.
*B21D 43/05* (2006.01)
*B21D 45/00* (2006.01)
*B21J 9/18* (2006.01)

(52) U.S. Cl.
USPC ..... 72/481.6; 72/481.1; 72/481.9; 72/453.13; 72/462; 29/428; 83/588

(58) Field of Classification Search
USPC ......... 72/361, 393, 405.01, 405.06, 420, 421, 72/453.13, 462, 470; 29/428; 83/568; 403/299
See application file for complete search history.

(56) References Cited

U.S. PATENT DOCUMENTS

| | | | |
|---|---|---|---|
| 4,282,736 A * | 8/1981 | Mashburn | 72/345 |
| 5,301,916 A | 4/1994 | Schmidt et al. | |
| 6,848,290 B2 | 2/2005 | Pyper et al. | |
| 7,024,910 B2 | 4/2006 | Pyper et al. | |
| 8,146,399 B2 | 4/2012 | Pyper et al. | |
| 8,522,595 B2 * | 9/2013 | Pyper et al. | 72/456 |
| 2005/0095062 A1 | 5/2005 | Iverson et al. | |
| 2009/0193951 A1 * | 8/2009 | Pyper et al. | 83/588 |
| 2012/0151984 A1 * | 6/2012 | Breen et al. | 72/462 |
| 2012/0151985 A1 * | 6/2012 | Breen et al. | 72/470 |

FOREIGN PATENT DOCUMENTS

WO 9723151 7/1997

OTHER PUBLICATIONS

Standard Lifters Inc., "Why Use Gas Spring Clamps," complete brochure, publication Apr. 2012 (rev. 3), 12 pages total, Grand Rapids, Michigan USA—see pp. 5, 8 and 9.

* cited by examiner

*Primary Examiner* — David B Jones
(74) *Attorney, Agent, or Firm* — Price Heneveld LLP

(57) ABSTRACT

A gas spring mount and related method for metal forming dies includes a one-piece, split clamping ring having a generally ovate plan shape with two spaced apart axes of symmetry. A generally circular clamping portion extends around the first axis, and is shaped to receive a gas spring body therein. A hook-shaped end extends around the second axis, and is shaped to receive a tapered head mounting member therein. A resilient free end is located operably between the clamping portion and the hook-shaped end portion, whereby tightening of the mounting member shifts the hook-shaped end outwardly and the free end inwardly to constrictingly pull the clamping ring securely against the gas spring body, and contemporaneously attach the assembly to an associated die member.

53 Claims, 7 Drawing Sheets

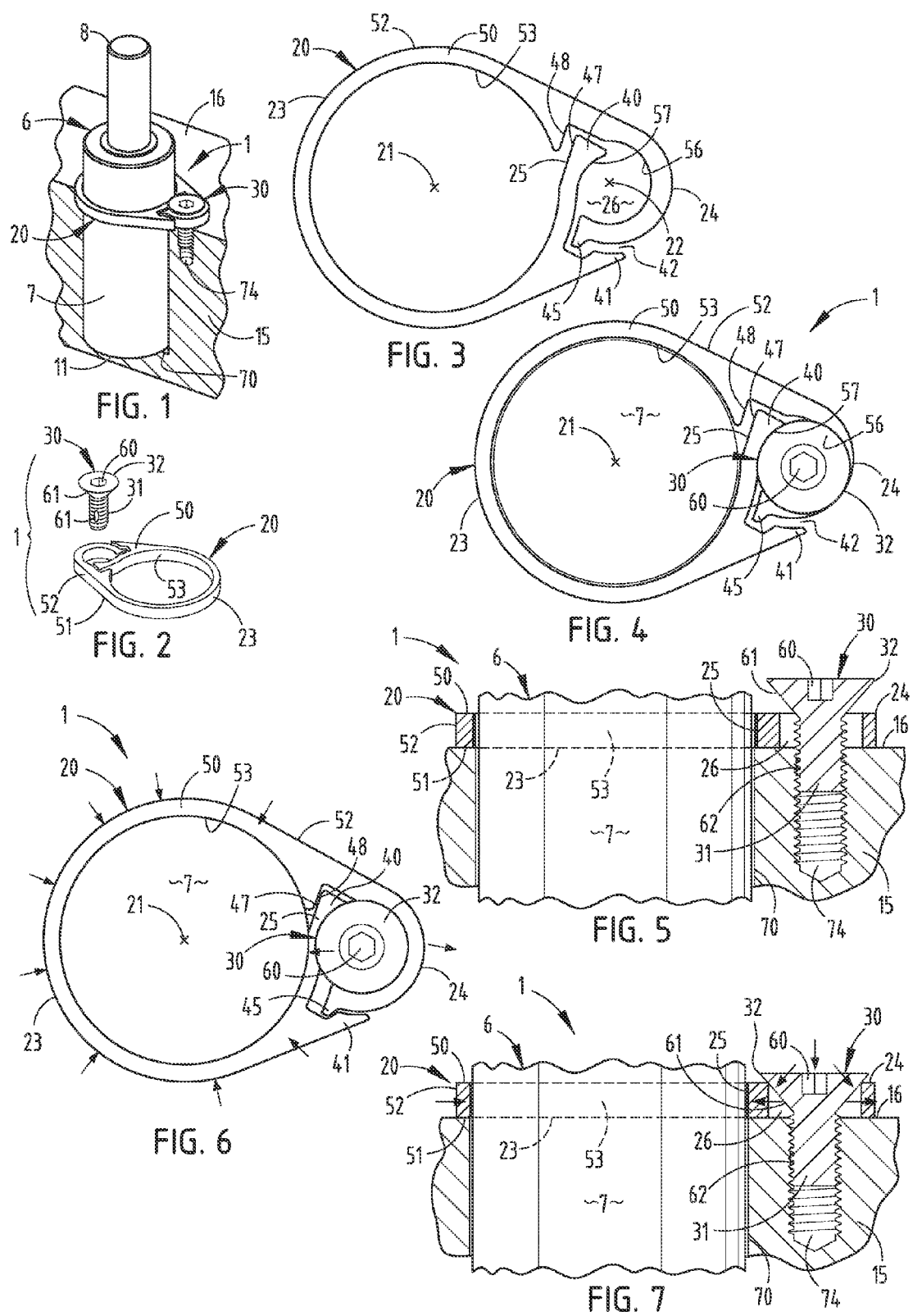

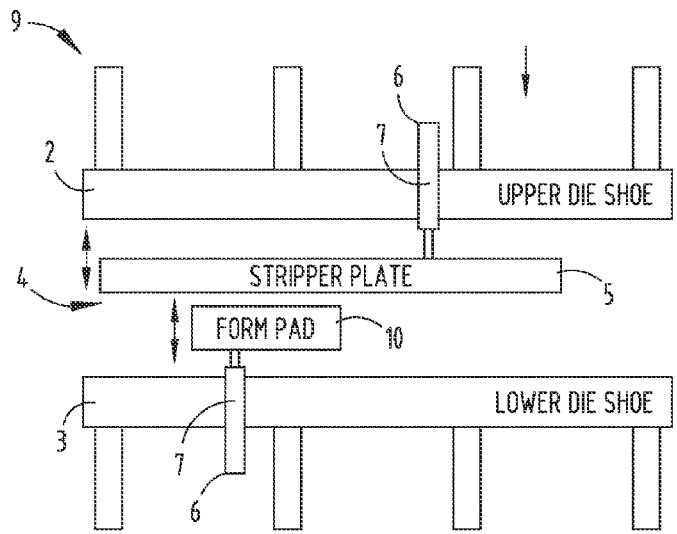
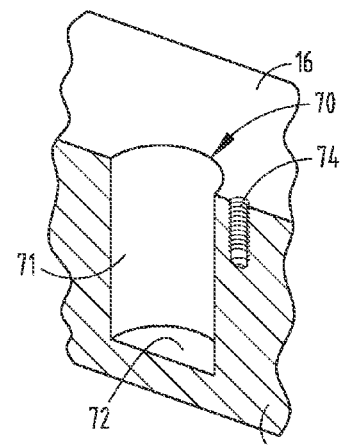
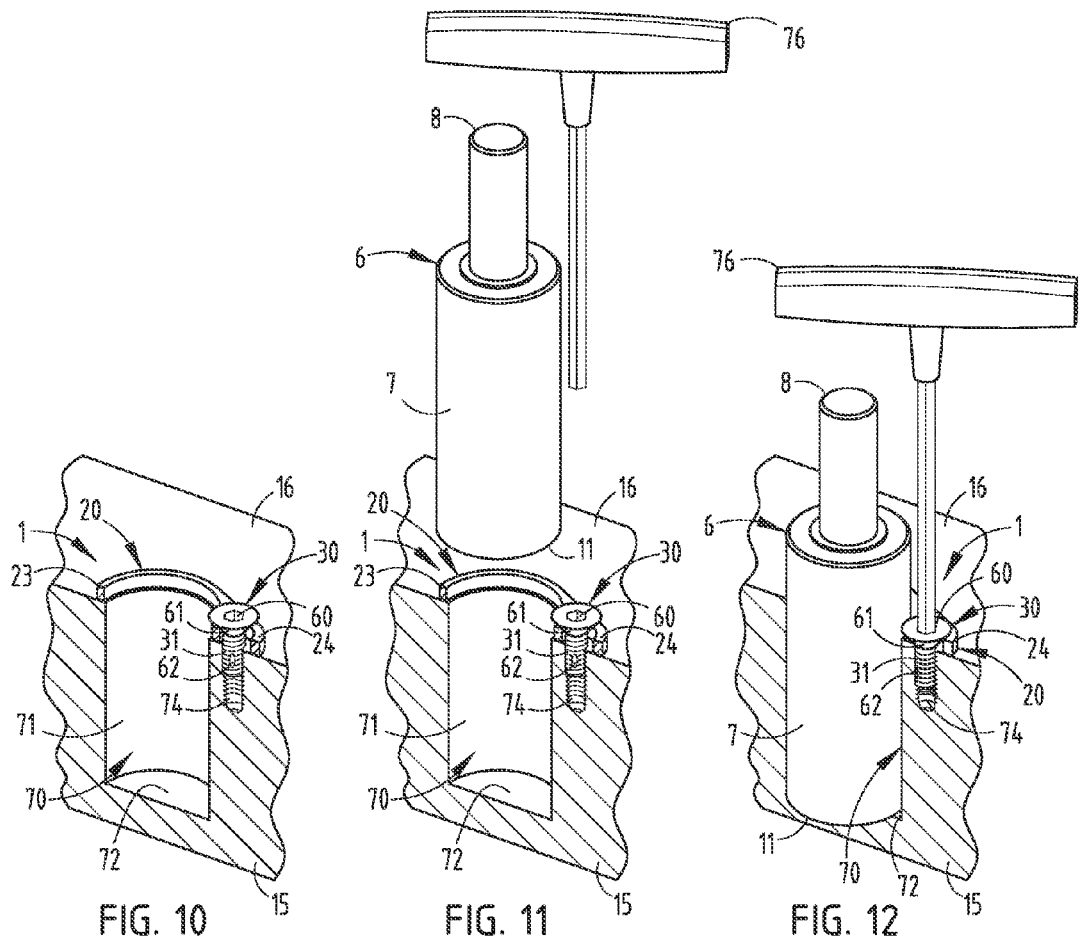
FIG. 8
FIG. 9
FIG. 10
FIG. 11
FIG. 12

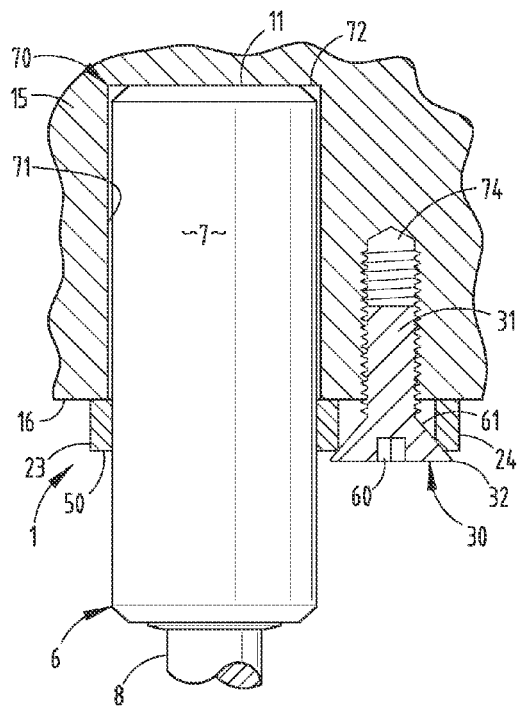
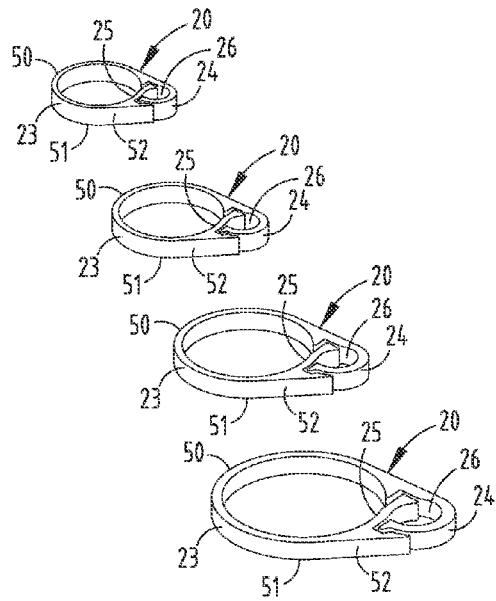
FIG. 16
FIG. 17
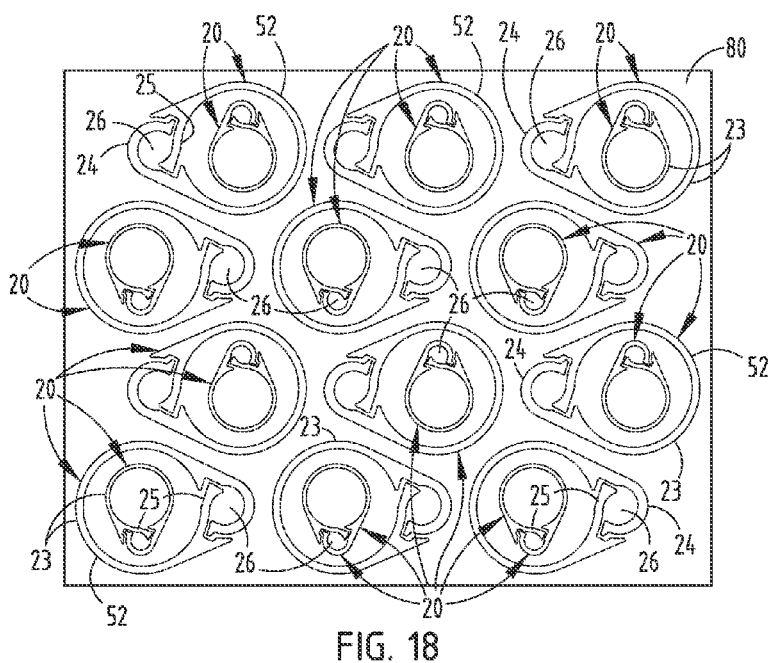
FIG. 18

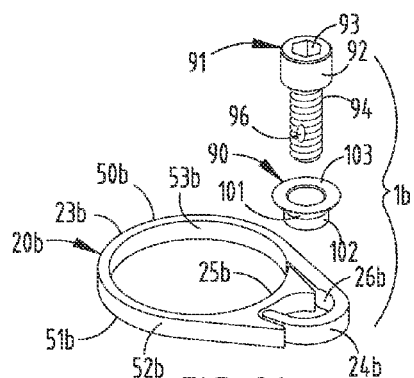
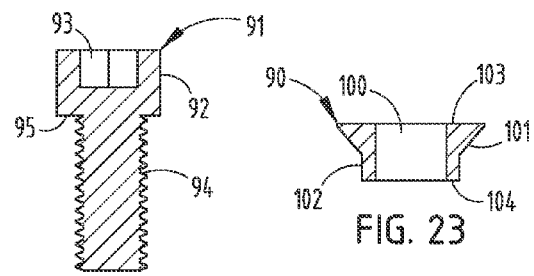
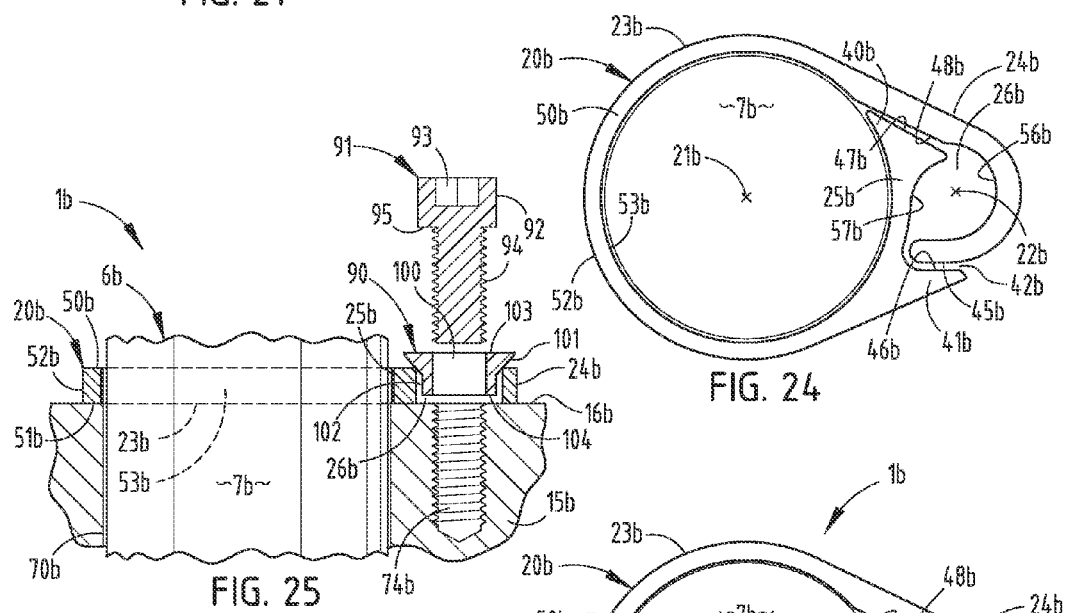
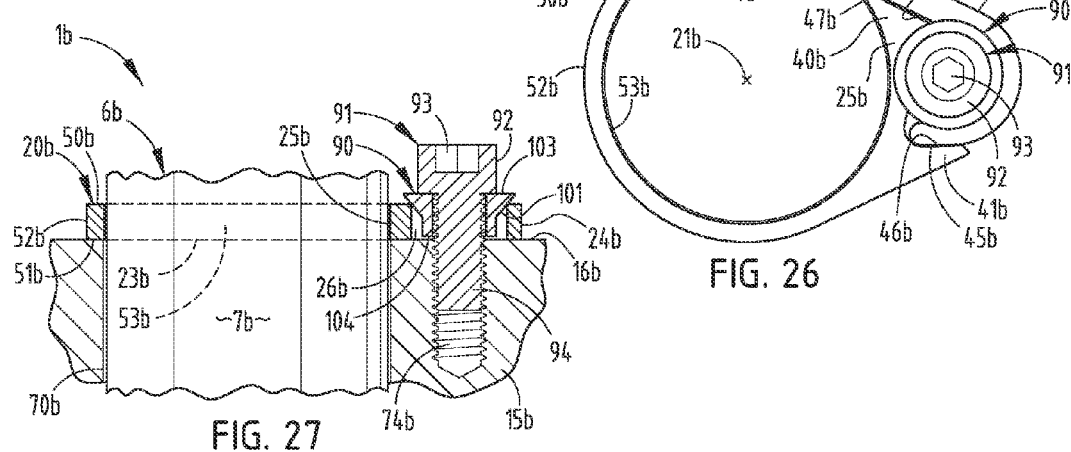

GAS SPRING MOUNTING ASSEMBLY AND METHOD FOR METAL FORMING DIES

CROSS REFERENCE TO RELATED APPLICATION AND CLAIM TO PRIORITY

The present application is related to commonly assigned, copending U.S. patent application Ser. No. 13/331,276, filed even date herewith, entitled GAS SPRING MOUNTING ASSEMBLY AND METHOD FOR METAL FORMING DIES, which is hereby incorporated herein by reference.

Applicants hereby claim the priority benefits under the provisions of 35 U.S.C. §119, basing said claim of priority on related Provisional Patent Application Ser. No. 61/425,372, filed Dec. 21, 2010.

BACKGROUND OF THE INVENTION

The present invention relates to metal forming dies the like, and in particular to a gas spring mounting assembly and associated method.

Metal forming dies, such as stamping dies and the like, are well known in the art. Progressive metal forming dies are unique, very sophisticated mechanisms which have multiple stations or progressions that are aligned longitudinally, and are designed to perform a specified operation at each station in a predetermined sequence to create a finished metal part. Progressive stamping dies are capable of forming complex metal parts at very high speeds so as to minimize manufacturing costs.

Heretofore, the dies used in metal forming presses have typically been individually designed, one of a kind assemblies for a particular part, with each of the various components being hand crafted and custom mounted or fitted in an associated die set, which is in turn positioned in a stamping press. Not only are the punches and the other forming tools in the die set individually designed and constructed, but the other parts or components of the die set, such as stock lifters, guides, end caps and keepers, cam returns, etc. are also custom designed, and installed in the die set. Current die making processes require carefully machined, precision holes, and recesses in the die set for mounting the individual components, such that the same are quite labor intensive, and require substantial lead time to make, test and set up in a stamping press.

Metal forming dies typically include an upper die shoe and a lower die shoe which are interconnected by guides and keepers for selected mutual reciprocation. Most modern metal forming dies also include a number of die components, such as stripper pads, forming pads, stock lifters, and the like, which are positioned in between the upper and lower die shoes and travel independently of the same as the die shoes converge and diverge during each stroke of the press. These die components perform a number of different functions, such as selectively applying pressure to certain areas of the stock strip to hold the same in place, creating forms or shapes in the stock strip, etc. Self-contained spring devices, such as coil springs, gas springs and the like are generally used to automatically shift these die components relative to one another and/or the two die shoes. Heretofore, spring devices have been mounted in the various die components and/or die shoes using custom fitting techniques that require time consuming, accurate machining, which increases the overall cost and complexity of the metal forming die. Precision holes and recesses must be carefully machined in the various die members to individually retain the various die components. While such prior art constructions are generally effective, they are complicated and expensive. A modular gas spring retainer and associated method which securely retains the gas springs on the various die components during assembly and maintenance of the tool during production, and prevents the same from inadvertently falling into the die during part production, would be clearly advantageous in simplifying metal forming die constructions and reducing the overall cost of designing, manufacturing and repairing metal forming dies.

SUMMARY OF THE INVENTION

One aspect of the present invention is a metal forming die of the type having at least one gas spring mounted between first and second reciprocating die members, which includes an improved gas spring retainer assembly. The gas spring retainer assembly comprises a one-piece, split clamping ring having a generally ovate plan shape with first and second spaced apart axes of symmetry. The clamping ring is defined by a generally circular, resilient clamping portion disposed generally about the first axis of symmetry and shaped to receive a body portion of the gas spring therein. The clamping ring also includes a hook shaped end portion disposed generally about the second axis of symmetry and shaped to receive a fastener therein for attaching the clamping ring to the first die member. The clamping ring also includes a resilient free end portion positioned operably between the clamping portion and the hook shaped end portion, and spaced radially from the second axis of symmetry to define an actuator space between the resilient free end portion and the hook shaped end portion. The gas spring retainer assembly also includes a mounting screw having a threaded shank portion configured for anchoring in the first die member and a tapered head portion with at least a portion thereof having an outside diameter that is greater than the actuator space between the hook shaped end portion of the clamping ring and the resilient free end portion of the clamping ring, whereby tightening of the mounting screw into the first die member engages the tapered head portion of the mounting screw against the hook shaped end portion of the clamping ring and shifts the same radially outwardly away from the second axis of symmetry, thereby pulling the clamping portion of the clamping ring constrictingly against the gas spring body, engages the tapered end portion of the mounting screw against the resilient free end portion of the clamping ring and shifts the same radially inwardly away from the second axis of symmetry and toward the first axis of symmetry, thereby further pulling the clamping ring constrictingly against the gas spring body, and securely, yet detachably, attaching the retainer assembly and the gas spring retained therein to the first die member.

Another aspect of the present invention is a retainer assembly for mounting gas springs in metal forming dies, comprising a one-piece, split clamping ring having a generally ovate plan shape with first and second spaced apart axes of symmetry. The clamping ring is defined by a generally circular clamping portion disposed generally about the first axis of symmetry and shaped to receive a gas spring body therein. The clamping ring also includes a hook shaped end portion disposed generally about the second axis of symmetry and shaped to receive a fastener therein for attaching the clamping ring to an associated metal forming die member. The clamping ring also includes a resilient free end portion positioned operably between the clamping portion and the hook-shaped end portion, and spaced radially from the second axis of symmetry to define an actuator spaced between the resilient free end portion and the hook-shaped end portion. The retainer assembly also includes a mounting screw having a threaded shank portion configured for anchoring in the metal forming die member and the tapered head portion with at least a portion thereof having an outside diameter that is greater than the actuator spaced between the hook-shaped end portion of the clamping ring and the resilient free end of the clamping ring, whereby tightening of the mounting screw into the associated metal forming die member engages the tapered end portion of the mounting screw against the hook shaped end portion of the clamping ring, and shifts the same radially outwardly away from the second axis of symmetry, thereby pulling the clamping portion from the clamping ring constrictingly against the gas spring body, engages the tapered head portion of the mounting screw against the resilient free end portion of the clamping ring and shifts the same radially inwardly away from the second axis of symmetry and toward the first axis of symmetry, thereby further pulling the clamping ring constrictingly against the gas spring body, and securely, yet detachably, attaching the retainer assembly and the gas spring retained therein to the associated metal forming die member.

Yet another aspect of the present invention is a metal forming die of the type having at least one gas spring mounted between first and second reciprocating die members and including an improved gas spring retainer assembly. The gas spring retainer assembly includes a one-piece split clamping ring having a generally ovate plan shape with first and second spaced apart axes of symmetry. The clamping ring is defined by a generally circular clamping portion disposed generally about the first axis of symmetry, and shaped to receive a body portion of the gas spring therein. The clamping ring also includes a hook-shaped end portion disposed generally about the second axis of symmetry and shaped to receive a fastener therein for attaching the clamping ring to the first die member. The clamping ring also includes a resilient free end portion positioned operably between the clamping portion and the hook-shaped end portion, and spaced radially from the second axis of symmetry to define an actuator spaced between the resilient free end portion and the hook-shaped end portion. The gas spring retainer assembly also includes a mounting screw having a threaded shank portion configured for anchoring in the first die member and an enlarged head portion. The gas spring retainer assembly also includes a tapered plug having a central aperture in which the shank portion of the mounting screw is retained, and a tapered exterior wall with at least a portion thereof having an outside diameter that is greater than the actuator spaced between the hook-shaped end portion of the clamping ring and the resilient free end of the clamping ring, whereby tightening of the mounting screw into the first die member engages the head portion of the mounting screw against the tapered plug, and draws the same toward the first die member, which engages the tapered exterior wall of the tapered plug against the hook-shaped end portion of the clamping ring and shifts the same radially outwardly away from the second axis of symmetry, thereby pulling the clamping portion of the clamping ring constrictingly against the gas spring body, engages the tapered exterior wall of the tapered plug against the resilient free end portion of the clamping ring and shifts the same radially inwardly away from the second axis of symmetry and toward the first axis of symmetry, thereby further pulling the clamping ring constrictingly against the gas spring body, and securely, yet detachably, attaching the retainer assembly and the gas spring retained therein to the first die member.

Yet another aspect of the present invention is a retainer assembly for mounting gas springs in metal forming dies, comprising a one-piece, split clamping ring having a generally ovate plan shape with first and second spaced apart axes of symmetry. The clamping ring is defined by a generally circular clamping portion disposed generally about the first axis of symmetry and shaped to receive a gas spring body therein. The clamping ring also has a hook shaped end portion disposed generally about the second axis of symmetry, and shaped to receive a fastener therein for attaching the clamping ring to an associated metal forming die member. The clamping ring also includes a resilient free end portion positioned operably between the clamping portion of the hook-shaped end portion, and spaced radially from the second axis of symmetry to define an actuator spaced between the resilient free end portion and the hook-shaped end portion. The retainer assembly also includes a mounting screw having a threaded shank portion configured for anchoring in the metal forming die member and an enlarged head portion. The retainer assembly also includes a tapered plug having a central aperture in which the shank portion of the mounting screw is retained, and a tapered exterior wall with at least a portion thereof having an outside diameter that is greater than the actuator spaced between the hook-shaped end portion of the clamping ring and the resilient free end of the clamping ring and the resilient free end of the clamping ring, whereby tightening of the mounting screw into the associated metal forming die member engages the head portion of the mounting screw against the tapered plug, and draws the same toward the associated metal form and die member, which engages the tapered exterior wall of the tapered plug against the hook shaped end portion of the clamping ring and shifts the same radially outwardly away from the second axis of symmetry, thereby pulling the clamping portion of the clamping ring constrictingly against the gas spring body, engages the tapered exterior wall of the tapered plug against the resilient free end portion of the clamping ring, and shifts the same radially inwardly away from the second axis of symmetry and toward the first axis of symmetry, thereby further pulling the clamping ring constrictingly against the gas spring body, and securely, yet detachably, attaching the retainer assembly and the gas spring retained therein to the associated metal forming die member.

Yet another aspect of the present invention is a method for making a metal forming die of the type having at least one gas spring mounted between first and second reciprocating die members, including forming a blind hole pocket in the first die member with a sidewall shaped for close reception of the body portion of the gas spring therein, and a bottom on which an end portion of the gas spring is abuttingly supported. The method also includes forming a threaded retainer aperture in the first die member at a location spaced laterally apart from the blind pocket a predetermined distance, and oriented generally parallel therewith. The method also includes forming a one-piece, split clamping ring with a generally ovate plan shape having first and second spaced apart axes of symmetry, and a generally circular, resilient clamping portion disposed generally about the first axis of symmetry and shaped to receive the gas spring body therein, a hook shaped end portion disposed generally about the second axis of symmetry and shaped to receive a fastener therein for attaching the clamping ring to the first die member, and a resilient free end portion positioned operably between the clamping portion and the hook shaped end portion, and spaced radially from the second axis of symmetry to define an actuator space between the resilient free end portion and the hook shaped end portion. The method further includes providing a mounting screw having a threaded shank portion configured for anchoring in the first die member, and a tapered head portion with at least a portion thereof having an outside diameter that is greater than the actuator space between the hook shaped end portion of the clamping ring and the resilient free end portion of the clamping ring. The method also includes positioning the clamping ring on the first die member with the clamping portion thereof disposed generally over the blind hole pocket, and the hook shaped end portion thereof disposed generally over the threaded retainer aperture in the first die member. The method also includes inserting the mounting screw through the hook-shaped end portion of the clamping ring and into the threaded retainer aperture in the first die member, and rotating the same to a loosely retained condition. The method further includes inserting the body portion of the gas spring through the clamping portion of the clamping ring and into the blind hole pocket in the first die member. The method also includes tightening the mounting screw in the threaded retainer aperture of the first die member, thereby engaging the tapered head portion of the mounting screw against the hook shaped end portion of the clamping ring and shifting the same radially outwardly away from the second axis of symmetry, thereby pulling the clamping portion of the clamping ring constrictingly against the gas spring body, engaging the tapered head portion of the mounting screw against the resilient free end portion of the clamping ring and shifting the same radially inwardly away from the second axis of symmetry and toward the first axis of symmetry, thereby further pulling the clamping ring constrictingly against the gas spring body, and securely, yet detachably, attaching the retainer assembly and the gas spring retained therein to the first die member.

Yet another aspect of the present invention is a method for making a metal forming die of the type having at least one gas spring mounted between first and second reciprocating die members, including forming a blind hole pocket in the first die member with a side wall shaped for close reception of the body portion of the gas spring therein, and a bottom on which an end portion of the gas spring is abuttingly supported. The method also includes forming a threaded retainer aperture in the first die member at a location spaced laterally apart from the blind hole pocket a predetermined distance, and oriented generally parallel therewith. The method also includes forming a one-piece, split clamping ring with a generally ovate plan shape and having first and second spaced apart axes of symmetry, and a generally circular, resilient clamping portion disposed generally about the first axis of symmetry and shaped to receive the gas spring body therein, a hook-shaped end portion disposed generally about the second axis of symmetry and shaped to receive a fastener therein for attaching the clamping ring to the first die member, and a resilient free end portion positioned operably between the clamping portion and the hook shaped end portion, and spaced radially from the second axis of symmetry to define an actuator spaced between the resilient free end portion and the hook-shaped end portion. The method also includes providing a mounting screw having a threaded shank portion configured for anchoring in the first die member and an enlarged head portion. The method also includes forming a tapered plug having a central aperture in which the shank portion of the mounting screw is retained, and a tapered exterior wall with at least a portion thereof having an outside diameter which is greater than the actuator spaced between the hook shaped end portion of the clamping ring and the resilient free end portion of the clamping ring. The method also includes positioning the clamping ring on the first die member with the clamping portion thereof disposed generally over the blind hole pocket, and the hook shaped end portion thereof disposed generally over the threaded retainer aperture in the first die member. The method further includes inserting the tapered plug into the hook shaped end portion of the clamping ring and inserting the mounting screw through the central aperture of the tapered plug and into the threaded retainer aperture in the first die member, and rotating the same to a loosely retained condition. The method also includes inserting the body portion of the gas spring through the clamping portion of the clamping ring and into the blind hole pocket in the first die member. The method also includes tightening the mounting screw in the threaded retainer aperture to the first die member, thereby engaging the head portion of the mounting screw against the tapered plug and drawing the same toward the first die member, thereby engaging the tapered exterior wall of the tapered plug against the hook shaped end portion of the clamping ring and shifting the same radially outwardly away from the second axis of symmetry, thereby pulling the clamping portion of the clamping ring constrictingly against the gas spring body, engaging the tapered exterior wall of the tapered plug against the resilient free end portion of the clamping ring, and shifting the same radially inwardly away from the second axis of symmetry and toward the first axis of symmetry, thereby further pulling the clamping ring constrictingly against the gas spring body, and securely, yet detachably, attaching the retainer assembly and the gas spring retained therein to the first die member.

Yet another aspect of the present invention is a gas spring mounting assembly and method for metal forming dies, which securely retains gas springs and other similar die components during both the assembly and maintenance of the metal forming die, and also prevents the gas springs from falling into the die during the production of die formed metal parts. The gas spring mounting assembly and method require only simple machining of the die members and/or components, and uses circumferential clamping about the body portion of the gas spring which makes abutting contact at multiple locations about the outside surface of the gas spring body to provide greater holding strength, while simultaneously centering the gas spring in the center of the blind hole pocket in the die member. The gas spring mounting assembly and method are compatible with a wide variety of differently shaped and sized gas springs, and can be installed anywhere along the length of the gas spring, without requiring special grooves or other retention features on the gas spring body for attachment. The gas spring mounting assembly and method permits the gas spring to be easily installed and removed from an associated die member or component, and provides a good visual indication of the clamp status. The gas spring mounting assembly and method provides a pre-made, modular retainer with an uncomplicated construction that avoids the need for expensive, custom in-house fabrication, which reduces machining cost, is easy to assemble, yet securely retains the gas spring in place with a minimal foot print and profile to facilitate installation in a wide variety of locations in the metal forming die. The gas spring mounting assembly preferably includes a standardized clamping ring design that can be used with either standard flat head cap screws, or with a tapered plug and standard socket head cap screw, so as to provide reduced cost and tool room inventory. The tapered plug embodiment of the gas spring mounting assembly bottoms on the mounting surface, thereby providing consistent clamping pressure, as well as positive protection from overtightening of the clamping ring. The uniquely shaped one-piece split clamping ring is adapted to be economically manufactured by cutting the same from solid plates of metal or the like, preferably arranged in a nested layout, such that the parts can be simply deburrred and surface treated, and do not require any additional machine processes, so as to reduce manufacturing time and cost. Laser and/or abrasive water jet cutting techniques may be used to economically manufacture the split clamping rings, and produce consistently shaped parts. The gas spring mounting assembly and method is efficient in use, economical to manufacture, capable of a long operating life and particularly well adapted for the proposed use.

These and other advantages of the invention will be further understood and appreciated by those skilled in the art by reference to the following written specification, claims, and appended drawings.

BRIEF DESCRIPTION OF THE DRAWINGS

FIG. 1 is a perspective view of a gas spring retainer assembly embodying the present invention, shown installed in an associated die member.

FIG. 2 is an exploded perspective view of the gas spring retainer assembly.

FIG. 3 is a plan view of a clamping ring portion of the gas spring retainer assembly, shown in a relaxed condition.

FIG. 4 is a plan view of the clamping ring with a mounting screw installed therein, shown in the relaxed condition about a gas spring body that is illustrated schematically.

FIG. 5 is a cross-sectional view of the gas spring retainer assembly, shown in the relaxed condition, along with an associated gas spring and die member.

FIG. 6 is a plan view of the clamping ring and mounting screw, shown in a clamped condition about a gas spring body that is illustrated schematically.

FIG. 7 is a cross-sectional view of the gas spring retainer assembly, shown in the clamped condition, along with an associated gas spring and die member.

FIG. 8 is a partially schematic, side elevational view of a metal forming die of the type in which the gas spring retainer assembly is used.

FIG. 9 is a fragmentary cross-sectional view of a die member in which a blind hole pocket and associated threaded retainer aperture have been formed for mounting the gas spring therein using the gas spring retainer assembly.

FIG. 10 is a fragmentary cross-sectional view of the die member shown in FIG. 9, wherein the gas spring retainer assembly has been assembled on the die member in the relaxed condition.

FIG. 11 is a fragmentary cross-sectional view of the die member shown in FIGS. 9 and 10, wherein a gas spring is positioned for insertion through the clamping ring and into the blind hole pocket for installation using an associated tool.

FIG. 12 is a fragmentary cross-sectional view of the die member shown in FIGS. 9-11, wherein the gas spring retainer assembly is shown tightened to the clamped position about the gas spring body using the tool.

FIG. 16 is a cross-sectional view of the gas spring retainer assembly, shown retaining an associated gas spring in an alternative orientation in an associated die member.

FIG. 17 is a perspective view of a series of the clamping rings of FIGS. 1-16, shown in varying sizes.

FIG. 18 is a plan view of a metal plate from which the clamping rings are to be cut in a nested condition.

FIG. 21 is an exploded perspective view of yet another embodiment of the gas spring retainer assembly embodying the present invention.

FIG. 22 is a cross-sectional view of the mounting screw portion of the gas spring retainer assembly shown in FIG. 21.

FIG. 23 is a cross-sectional view of a tapered plug portion of the gas spring retainer assembly shown in FIGS. 21 and 22.

FIG. 24 is a plan view of a clamping ring portion of the gas spring retainer assembly shown in FIGS. 21-23.

FIG. 25 is a cross-sectional view of the gas spring retainer assembly shown in FIGS. 21-24, prior to assembly, with an associated gas spring positioned in a die member.

FIG. 26 is a plan view of the gas spring retainer assembly of FIGS. 21-25, shown in the clamped condition.

FIG. 27 is a cross-sectional view of the gas spring retainer assembly of FIGS. 21-26, shown in the clamped condition, along with an associated gas spring and die member.

DETAILED DESCRIPTION OF THE PREFERRED EMBODIMENTS

Figure 13:
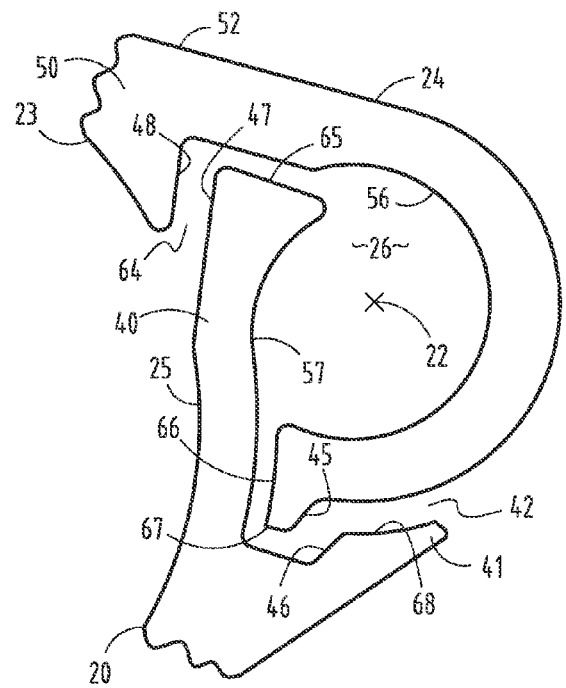
FIG. 13 is an enlarged, fragmentary plan view of an end portion of the clamping ring, shown in the relaxed condition.

For purposes of description herein, the terms "upper," "lower," "right," "left," "rear," "front," "vertical," "horizontal" and derivatives thereof shall relate to the invention as oriented in FIGS. 1-7. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIGS. 1-7) generally designates a gas spring retainer assembly embodying the present invention. Gas spring retainer assembly 1 is particularly adapted for use in conjunction with metal forming dies of the type illustrated in FIG. 8, having an upper die shoe 2, a lower die shoe 3, and a plurality of other die components 4 mounted between upper die shoe 2 and lower die shoe 3. In the example illustrated in FIG. 8, these die components 4 include a stripper plate 5, which is operably supported on upper die shoe 2 and reciprocates relative to upper die shoe 2. A first gas spring 6, or other similar biasing mechanism, is positioned operably between upper die shoe 2 and stripper plate 5, with the body portion 7 connected to upper die shoe 2 and the rod portion 8 connected to stripper plate 5, and is configured resiliently to urge stripper pad 5 outwardly to a normally diverged position relative to upper die shoe 2. Stripper plate 5 typically serves the purpose of shifting the strip of stock away from the metal forming components of the die or die set 9. In the example illustrated in FIG. 8, die components 4 also include a forming pad 7, which is operably connected with lower die shoe 3 and reciprocates relative to lower die shoe 3. A second gas spring 6 or other similar biasing mechanism, is positioned operably between forming pad 10 and lower die shoe 3, with the body portion 7 connected to lower die shoe 3, and the rod portion 6 connected to forming pad 10, and is configured to resiliently urge forming pad 7 into a normally diverged position relative to lower die shoe 2. As is well known in the metal forming art, the complete die or die set 9, comprising upper die shoe 2, lower die shoe 3 and other die components 4, is mounted in an associated stamping press (not shown). The ram portion of the stamping press strokes the upper die shoe 2, and other die components 4 supported thereon, upwardly and downwardly, while the lower die shoe 3, and other die components 4 thereon, remains stationary. At least portions of many of the die components 4 travel independently of the upper and lower die shoes 2, 3 as the upper and lower die shoes converge and diverge, such as the stripper plate 5 and forming pad 10 shown in FIG. 8. In general, the die components 4 perform a number of different functions, such as applying pressure to the metal stock and creating forms in the metal stock. The gas springs 6, or other similar biasing devices, are used to create the pressure between the die shoes 2, 3 and traveling die components 4. Heretofore, the gas springs 6 and/or other similar biasing devices have typically been mounted or otherwise secured to the associated die shoes 2, 3 or the other die component 4 using a variety of different fastening systems, including a catch tab, urethane disc, flanges and the like, which while generally effective, are time consuming and costly to individually fabricate and install for each gas spring 6 in the die set 9.

The present gas spring retainer assembly 1 (FIGS. 1-7) includes a one-piece, split clamping ring 20 having a generally ovate plan shape with first and second spaced apart axes of symmetry 21 and 22. Clamping ring 20 is defined by a generally circular clamping portion 23, which is disposed generally about the first axis of symmetry 21 and is shaped to receive the body portion 7 of an associated gas spring 6 therein. Clamping ring 20 is also defined by a hook shaped end portion 24, which is disposed generally about the second axis of symmetry 22, as well as a resilient free end portion 25, that is positioned operably between clamping portion 23 and hook shaped end portion 24, and is spaced radially from the second axis of symmetry 22 to define an actuator space 26 between the free end portion 25 and the hook shaped end portion 24. Gas spring retainer assembly 1 also includes a mounting screw 30 having a threaded shank portion 31 configured for anchoring in an associated die member, and a tapered head portion 32, at least a portion of which has an outside diameter that is greater than the actuator space 26 between the hook shaped end portion 24 of the clamping ring 20 and the resilient free end portion 25 of clamping ring 20. The tightening of mounting screw 30 into an associated metal forming die member engages the tapered head portion 32 of mounting screw 30 against the hook shaped end portion 24 of clamping ring 20 and shifts the same radially outwardly away from the second axis of symmetry 22, thereby pulling the clamping portion 23 of clamping ring 20 constrictingly against the gas spring body 7. The tightening of mounting screw 30 simultaneously engages the tapered head portion 32 of mounting screw 30 against the resilient free end portion 25 of clamping ring 20 and shifts the same radially inwardly away from the second axis of symmetry 22 and toward the first axis of symmetry 21, thereby further pulling clamping ring 20 constrictingly against the gas spring body. Finally, the tightening of mounting screw 30 also contemporaneously attaches the gas spring retainer assembly 1 and the gas spring 6 mounted therein to the associated metal forming die member in a very secure, yet detachable manner.

Figure 14:
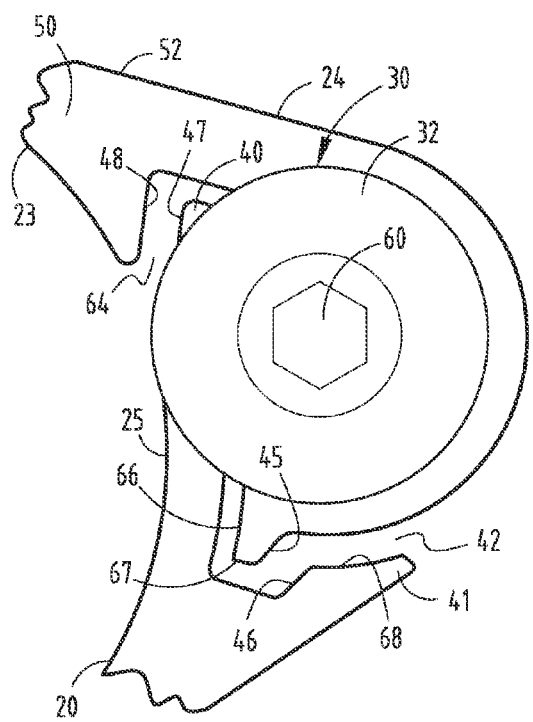
FIG. 14 is an enlarged, fragmentary plan view of the clamping ring end of FIG. 13, wherein the mounting screw has been installed in a hook-shaped end portion of the clamping ring, which is shown in the relaxed condition.
Figure 15:
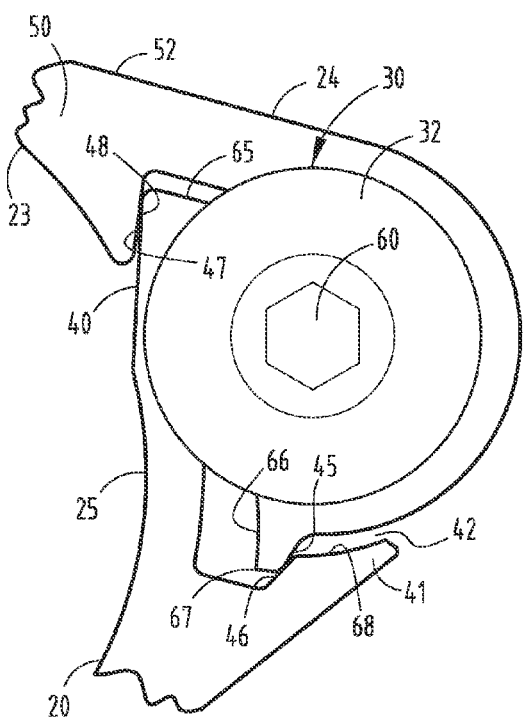
FIG. 15 is an enlarged, fragmentary plan view of the clamping ring end and mounting screw of FIG. 14, shown in the clamped condition.

The gas spring retainer assembly illustrated in FIGS. 1-7 has the tapered head portion 32 of mounting screw 30 configured such that when mounting screw 30 is loosely retained in the associated die member, clamping ring 20 assumes an unclamped or relaxed condition, as shown in FIGS. 2-5, in which the gas spring body 7 can be freely inserted into and removed from the clamping portion 23 of clamping ring 20, and when mounting screw 30 is tightly anchored in the associated die member, as shown in FIGS. 1, 6 and 7, clamping ring 20 assumes a tensed or clamped condition in which the gas spring body 7 is securely retained in the clamping portion 23 of clamping ring 20. In the examples illustrated in FIGS. 1-18, the resilient free end portion 25 of clamping ring 20 has a generally L-shaped plan configuration defined by a first leg 40 positioned operably between the clamping portion 23 and the hook shaped end portion 24, and a second leg 41 extending outwardly of the first leg 40 to a location spaced apart from the hook-shaped end portion 24 and forming a space 42 therebetween in the relaxed condition, as shown in FIGS. 2-5. As best shown in FIGS. 13-15, in the illustrated example, the hook-shaped end portion 24 of clamping ring 20 includes a first stop surface 45 which abuts a second stop surface 46 adjacent the second leg 41 of the resilient free end portion 25 of clamping ring 20 when mounting screw 30 is tightened to the clamped condition, as shown in FIG. 15, and thereby positively limits the constriction of the clamping portion 23 of clamping ring 20, about gas spring body 7. Also, the first leg 40 of the resilient free end portion 25 of clamping ring 20 includes a third stop surface 47 which abuts a fourth stop surface 48 adjacent the clamping portion 23 of clamping ring 20 when mounting screw 30 is tightened to the clamped condition, as shown in FIG. 15, and thereby positively limits the constriction of the clamping portion 23 of clamping ring 20 about the gas spring body 7. In the illustrated example, first stop surface 45 protrudes radially outwardly adjacent the terminal area of the hook end portion 20 of clamping ring 20, and has a generally shoe or boot shaped profile. The illustrated second stop surface 46 is formed in a generally U-shaped notch disposed medially between the first and second legs 40, 41 of the free end portion 25 of clamping ring 20, and selectively receives the first stop 45 therein. The illustrated fourth stop surface 48 protrudes inwardly from the interior surface of the hook end portion 25 of clamping ring 20, has a V-shaped profile and selectively engages a generally linear end portion of the first leg 40 of free end 25 adjacent a terminal surface thereof.

As is described in greater detail hereinafter, clamping ring 20 is preferably cut from a flat plate of material that is resiliently deformable, such as metal or the like, and includes flat, mutually parallel upper and lower faces 50 and 51, a generally ovate marginal outer sidewall surface 52 and a generally circular inner sidewall surface 53, both of which are disposed generally perpendicular to upper and lower faces 50, 51. The hook-shaped end portion 24 of clamping ring 20 includes an arcuate inner side wall 56 that is similarly disposed generally perpendicular with upper and lower faces 50, 51, and the free end portion 25 of clamping ring 20 includes an outer sidewall 57, which faces inner side wall 56, and is similarly perpendicular to upper and lower faces 50, 51. In the illustrated example, clamping ring 20 has a split ring or band shape plan configuration, wherein the clamping portion 23 is generally cylindrical in shape, and is sized slightly larger than the outer diameter of the body portion 7 of the gas spring 6 to be retained therein.

The illustrated mounting screw 20 (FIGS. 1-12) is in the form of a standard flat head cap screw, which includes a socket 60 formed in the circular outer end of the tapered head 32 to receive an associated tool therein for screwing and unscrewing mounting screw 30 relative to the associated die member. The frusto-conical outer surface 61 of tapered head 32 tapers radially inwardly from the circular outer end of tapered head 32 to the outside surface of the threaded shank 31. The illustrated mounting screw 30 also includes a self-locking nylon patch 62 disposed on the outer surface of shank portion 31, which serves to retain the mounting screw 30 tight in the associated die member, at least when clamping ring 20 is in the clamped condition. The taper head 32 configuration of mounting screw 30, and related width of actuator space 26 in the hook-shaped end of clamping ring 20, along with the single mounting screw design, provide a compact, low profile retainer that facilitates efficient construction of die set 9.

As best illustrated in FIGS. 4-7, clamping ring 20 is configured such that contact between the tapered head portion 32 of mounting screw 30 and the hook-shaped end portion 24 of clamping ring 20 occurs at a single point to facilitate shifting clamping ring 20 between the clamped and relaxed conditions. Similarly, clamping ring 20 is configured such that contact between the tapered head portion 32 of mounting screw 30 and the resilient free end portion 25 of clamping ring 20 occurs at a single point to facilitate shifting the clamping ring 20 between the clamped and relaxed conditions.

In the example illustrated in FIGS. 1-18, clamping ring 20 has a solid metal construction, and is preferably made from steel or the like, which is strong and durable, yet has some elastic deformation that permits the clamping ring 20 to resiliently shift between the relaxed condition (FIGS. 2-5) and the clamped condition (FIGS. 1, 6 and 7). The clamping portion 23 of the illustrated clamping ring 20 has a generally cylindrical or annular plan shape, wherein the sidewall thickness is selected to achieve the desired resilient flexure when constrictingly engaging the body portion 7 of an associated gas spring 6, yet achieve substantial resilient tensile strength for secure clamping around the associated gas spring body 7, and durability for repeated flexure between the clamped and relaxed conditions. The inner sidewall 53 of clamping ring 20 is split or separated at a terminal area of free end portion 25, such that a generally L-shaped gap or space 64 is formed in the relaxed condition between the stop surfaces 47 and 48, and the end surface 65 of free end portion 25 and that portion of the hook-shaped end inner sidewall 56 disposed nearest stop surface 48. The outer sidewall 52 of clamping ring 20 is split or separated at the terminal area of hook-shaped end portion 24, such that a generally U-shaped gap or space 42 is formed in the relaxed condition along the end surface 66 and toe surface 67 of hook-shaped end portion 24, stop surfaces 45 and 46 and the interior, arcuate surface 68 of second leg 41 adjacent the end thereof. The gaps 42 and 64 in clamping ring 20 assist in permitting the same to shift between the relaxed and clamped conditions, change in shape and size as mounting screw 30 is tightened in the associated die member, and finally close when the clamping ring 20 reaches the fully clamped condition, as best shown in FIG. 15. In the embodiment illustrated in FIGS. 1-18, the inner sidewall 53 of clamping ring 20 abuts the outer surface of the gas spring body 7 retained therein at numerous locations about the circumference of gas spring body 7 to provide substantially continuous and uniform constricting clamping forces with improved holding strength, as represented by the arrows in FIG. 6, and also to accurately center gas spring body 7 in pocket 70. Also, mounting screw 30 is configured relative to the thickness of hook-shaped end portion 24, such that the lowermost portion of tapered head 32 does not abut or bottom out against the adjacent mounting face 16 of the associated die member 15, as shown in FIG. 7, whereby the constricting clamping forces applied by clamping ring 20 around the gas spring body 7 are limited only by contact between stop surfaces 45-48. More specifically, when both sets of stop surfaces 45 and 46 and 47 and 48 are in full abutting contact, they positively limit the constriction of the clamping portion 23 of clamping ring 20 about gas spring body 7, so as to achieve the desired, predetermined amount of clamping force which is designed to securely retain the gas spring 6 in place, without damaging the gas spring body 7, or the clamping ring 20. Since the tapered head portion 32 of mounting screw 30 does not bottom out against the associated die member in the fully clamped condition, full contact between both sets of stop surfaces 45 and 46 and 47 and 48 is assured, as is achieving the desired, predetermined clamping forces around gas spring body 7. Stop surfaces 45-48 permit clamping ring 20 to be placed in the fully clamped condition without over stretching or otherwise permanently deforming or damaging clamping ring 20, even when a gas spring body 7 is not positioned within the clamping portion 23 thereof, thereby providing additional protection to the integrity of the subject retainer assembly 1. The sizes of the spaces 42 and 64 in clamping ring 20 also provide the installer with an accurate visual indication of the clamp status or condition of clamping ring 20, wherein when spaces 42 and 64 are closed off, clamping ring 20 is in the fully clamped condition, and when spaces 42 and 64 are fully open, clamping ring 20 is in the fully relaxed condition, with intermediate conditions that are also visually easily recognizable.

With reference to FIGS. 9-12, gas spring retainer assembly 1 is used to mount a gas spring 6 in an associated die member 15 in the following manner. Initially, as will be readily appreciated by those skilled in the art, gas spring retainer assembly 1 can be used to mount a wide variety of differently sized and shaped gas springs in numerous locations and orientations in any given metal forming die. Hence, the term "die member" as used herein, refers to any portion of die set 9, including, but not limited to, upper die shoe 2, lower die shoe 3, and all die components 4. As shown in FIG. 9, a blind hole pocket 70 is formed in the associated die member 15 with a cylindrically shaped side wall 71 shaped for close reception of the body portion 7 of the gas spring 6 therein, and a bottom wall 72 on which the end portion 11 of the gas spring body 7 is abuttingly supported. A single threaded retainer aperture 74 also formed in the die member 15 at a location spaced laterally apart a predetermined distance from the blind hole pocket 70, and oriented generally parallel therewith. Pocket 70 and retainer aperture 74 can be formed using simple, conventional machining techniques. With reference to FIG. 10, the clamping ring 20 is then placed abuttingly on the top or outer surface 16 of the die member 15, with the clamping portion 23 positioned generally over the blind hole pocket 70, and the hook shaped end portion 24 positioned generally over the threaded retainer aperture 74. Mounting screw 30 is then inserted through the actuator space 26 between hook-shaped end portion 24 and free end portion 25 of clamping ring 20, and engaged into the threaded retainer aperture 74 in a loose or untightened relationship, so that the clamping ring 20 assumes the relaxed condition. With reference to FIG. 11, the body portion 7 of the gas spring 6 is then inserted through the clamping portion 23 of clamping ring 20, and into the blind hole pocket 70 in die member 15, until the end 11 of the gas spring body 7 abuts the bottom 72 of blind hole pocket 70. With reference to FIG. 12, a tool, such as the illustrated Allen wrench 76, is inserted into the socket 60 in the head portion of mounting screw 30, and rotated to tighten the mounting screw 30 in the die member 15, until the clamping ring 20 assumes the fully clamped condition (FIGS. 1, 6 and 7). As the mounting screw 30 is tightened, the outside surface 61 of the tapered head portion 32 of mounting screw 30 abuts the hook-shaped end portion 24 of clamping ring 20, causing a camming interface therebetween which pulls or shifts the same radially outwardly away from the second axis of symmetry 22, as illustrated by the arrows in FIGS. 6 and 7, thereby pulling the clamping portion 23 of clamping ring 20 constrictingly against the body 7 of gas spring 6. Finally, the tightening of the mounting screw 30 also simultaneously engages the outer surface 61 of the tapered head portion 32 of mounting screw 30 against the resilient free end portion 25 of clamping ring 20, causing a camming interface that shifts the same radially inwardly away from the second axis of symmetry 22 and toward the first axis of symmetry 21, as illustrated by the arrows in FIGS. 6 and 7, thereby further pulling the clamping ring 20 constrictingly against the body 7 of gas spring 6. Finally, the tightening of mounting screw 30 also contemporaneously attaches the gas spring retainer assembly 1 and the gas spring 6 retained therein to the associated die member 15. As discussed above, and shown in FIGS. 1-7, as mounting screw 30 is tightened, both sets of stop surfaces 45 and 46 and 47 and 48 will abut, and thereby positively limit the amount of constricting clamping forces clamping ring 20 applies to gas spring body 7 to the predetermined designed amount, so as to securely retain the gas spring 6 in place in the die member 15, without damaging either the gas spring body 7, or working parts therein, or the clamping ring 20. The tapered head 32 of mounting screw 30 is designed relative to the thickness of the hook-shaped end portion of clamping ring 20, so that it does not abut or bottom out on the outer surface 16 of die member 15, thereby assuring full contact between both sets of stop surfaces 45 and 46 and 47 and 48, and attaining the predetermined designed clamping force. The gas spring 6 is not only securely, yet detachably clamped in gas spring retainer, it is also simultaneously accurately centered within the blind hole pocket 70 of the die member 15. The gas spring 6 can be easily removed from the gas spring retainer assembly 1 and detached from the die member 15 by simply untightening mounting screw 30, such that clamping ring 20 automatically shifts back to the relaxed condition due to the resilient nature of clamping ring 20.

Figure 28:
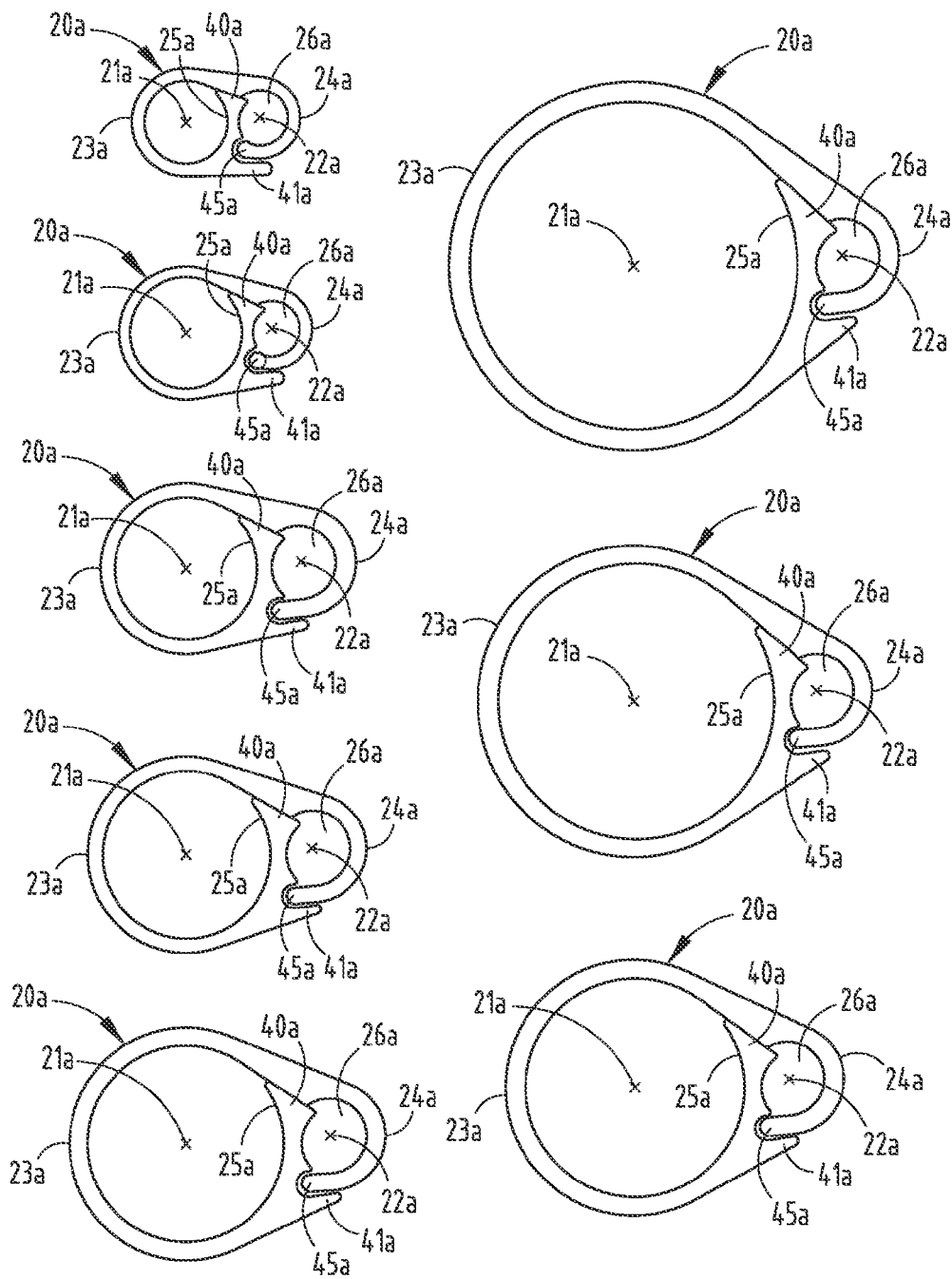
FIG. 28 is a plan view of a series of the clamping rings of FIGS. 21-27, shown in varying sizes.

FIG. 28 illustrates a series of clamping rings 20a of the type shown in FIGS. 21-27, which incorporate the same basic design and function, but are provided in a wide variety of sizes and/or diameters to accommodate differently sized gas springs 6. It is noteworthy that the smaller hook-shaped ends 24a of the six largest clamping rings 20a shown in FIG. 28 have a substantially identical size and shape, and are configured to receive therein an identical tapered plug 90 and cap screw 91 for attaching a selected one of the gas springs 6 to an associated die member 15, whereas the diameter of the clamping portions 23a of these same clamping bands 20a in FIG. 28 varies substantially to accommodate a wide variety of gas spring body sizes to be retained therein. The smallest two of the clamping rings 20a shown in FIG. 28 have a somewhat smaller hook-shaped ends 24a, which receive a smaller sized tapered plug 90 and cap screw 91. The plan shape of the largest clamping bands 20a shown in FIG. 28 is clearly ovate, whereas, the plan shape of the smallest clamping bands shown in FIG. 28 is more squared off or somewhat rectangular.

As is apparent to those having skill in the art, gas spring retainer assembly 1 can be used to mount differently shaped and sized gas springs in upper die shoes, lower die shoes, and other die components in a wide variety of different positions and orientations, including the example illustrated in FIG. 1, wherein gas spring retainer assembly 1 is shown attached to a lower die shoe, or a forming pad, as well as the orientation illustrated in FIG. 16, wherein the gas spring retainer assembly 1 is shown attached to an upper die shoe or to a stripper plate. The clamping forces generated by gas spring retainer assembly 1 are sufficient to securely retain an associated gas spring 6 in place anywhere along the length of the gas spring body, and without the need for mounting grooves, ribs or other special retainer features or profiles in the outside surface of the gas spring body 7, as is required by many current gas spring retainer systems.

As best illustrated in FIG. 17, clamping ring 20 is preferably provided in a wide variety of different sizes or diameters to accommodate mounting differently sized gas springs. While the diameter of the interior side wall 53 of the clamping portion 23 of clamping ring 20 varies in accordance with the outside diameter of the associated gas spring 6, the overall configuration, design and function of the gas spring retainer assembly 1 is the same for all such sizes. More specifically, in the embodiment illustrated in FIGS. 1-18, the diameter of the interior side wall 53 of the clamping portion 23 of clamping ring 20 is purposely formed slightly larger than the outside diameter of the associated gas spring body 7. For example, in one working embodiment of the present invention, the diameter of the interior sidewall 53 of the clamping portion 23 of clamping ring 20 is in the range of 0.758 to 0.770 inches, with an associated radial wall thickness in the range of 0.095 to 0.106 inches, and lateral thickness of 0.230 to 0.280 inches, which is designed to receive therein a gas spring body 7 having an outside diameter of 0.748 inches or 19 mm. In another working embodiment of the present invention, the diameter of the interior sidewall 53 of the clamping portion 23 of clamping ring 20 with an associated radial wall thickness in the range of 1.767 to 1.800 inches, and lateral thickness of 0.156 to 0.172 inches, is in the range of 0.230 to 0.280 inches, which is designed to receive therein a gas spring body 7 having an outside diameter of 1.752 inches or 44.5 mm. In yet another working embodiment of the present invention, the diameter of the interior sidewall 53 of the clamping portion 23 of clamping ring 20 with an associated radial wall thickness in the range of 2.973 to 3.002 inches, and lateral thickness of 0.167 to 0.192 inches, is in the range of 0.350 to 0.400 inches, which is designed to receive therein a gas spring body 7 having an outside diameter of 2.953 inches or 75 mm. As will be appreciated by those skilled in the art, the difference between the diameter of the associated gas spring body 7 can be adjusted, along with the radial wall thickness of clamping portion 23, the material being used, and other similar factors to obtain the desired clamping force for any given application.

As best illustrated in FIG. 18, a plurality of clamping rings 20 are preferably cut from a solid flat plate of material that is generally rigid, although is capable of elastic deformation, such as various metals, including steel and the like. In the example illustrated in FIG. 18, differently sized clamping rings 20 are cut from a single plate 80 of 1018 carbon steel stock material, using a nested pattern, so as to improve economy of manufacture and reduce waste. The various clamping rings 20 are preferably cut from the plate 80 using either a laser cutting process, an abrasive water jet process, or other similar techniques. Since the opposite faces 50 and 51 of the clamping ring 20 and related marginal surfaces 52, 53, 56, 57, etc. are disposed in a mutually perpendicular relationship, no additional machining or processing is required after cutting. The plate-cut clamping rings 20 can simply be deburred and surface treated if necessary, thereby minimizing manufacturing costs. Such cutting techniques provide very accurate and consistent size and shape tolerances, and permit marking all of the clamping rings 20 with identification indicia prior to the final cutting in a single set up in the cutting machine, thereby improving accuracy and efficiency.

Figure 19:
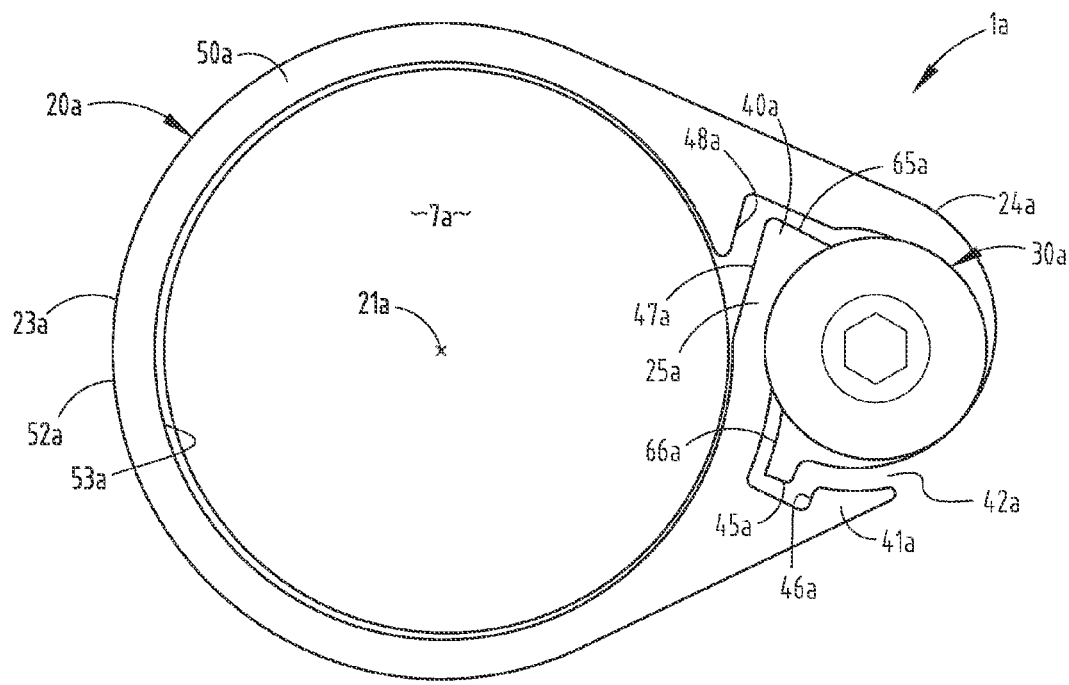
FIG. 19 is an enlarged plan view of an alternative embodiment of the gas spring retainer assembly embodying the present invention, shown in the relaxed condition.
Figure 20:
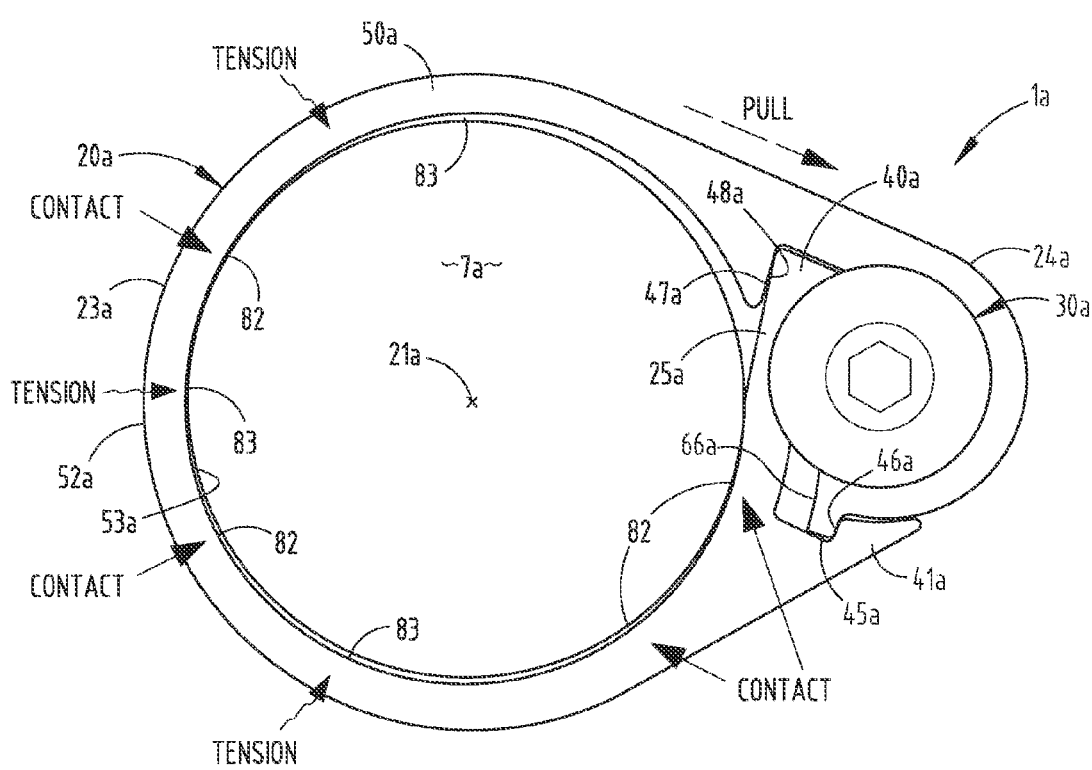
FIG. 20 is an enlarged plan view of the gas spring retainer assembly of FIG. 19, shown in the clamped condition.

The reference numeral 1a (FIGS. 19 and 20), generally designates another embodiment of the present invention.

Since gas spring retainer assembly 1a is similar to the previously described gas spring retainer assembly 1, similar parts appearing in FIGS. 1-18 and 19-20, respectively, are represented by the same, corresponding reference numerals, except for the suffix "a" in the numerals of the latter. In gas spring retainer assembly 1a, the configurations of clamping ring 20a and mounting screw 30a are generally similar to that of previously described clamping ring 20 and mounting screw 30. The clamping portion 23a of clamping ring 20a has the inner marginal sidewall surface 53a formed in a circular plan shape when in the relaxed or as manufactured condition. Preferably, the diameter of the inner marginal sidewall surface 53a of the clamping portion 23a is sized slightly larger than the outside diameter of the gas spring body 7a to be retained therein. Consequently, the gas spring body 7a can be easily inserted through the clamping portion 23a of clamping ring 20a when clamping ring 20a is in the relaxed condition shown in FIG. 19. The clamping ring 20a has a resilient and elastically deformable construction, whereby in the clamped condition, shown in FIG. 20, the inner marginal side wall 53a of clamping ring 20a assumes a slightly non-circular or generally obround plan shape defined by a plurality of circumferentially spaced apart contact surfaces 82 that abut the outside surface of gas spring body 7a, as well as a plurality of non-contact surfaces 83 disposed circumferentially in between the contact surfaces 82. When mounting screw 30a is tightened to the clamped condition shown in FIG. 20, those portions of clamping ring 20 associated with the non-contact surfaces 83 resiliently tense in a generally longitudinal or lengthwise direction and draw the contact surfaces 82 abuttingly against the gas spring body to securely, yet releasably retain the gas spring body 7 in the clamping ring 20a. More specifically, the longitudinal tensing of those portions of clamping ring 20a associated with the multiple non-contact surfaces 83, which are spaced apart circumferentially about the gas spring body 7a in the manner shown in FIG. 20, stretches the same slightly, thereby generating a constant clamping force that is constricting applied to the gas spring body 7a at the multiple, circumferentially spaced apart contact surfaces 82. In the example illustrated in FIG. 20, clamping ring 20a has four contact surfaces 82 separated by three non-contact surfaces 83 that generate tension through slight longitudinal stretching.

The reference numeral 1b (FIGS. 21-27) generally designates yet another embodiment of the present invention. Since gas spring retainer assembly 1b is similar to the previously described gas spring retainer assembly 1, similar parts appearing in FIGS. 1-18 and 21-27, respectively, are represented by the same, corresponding reference numerals, except for the suffix "b" in the numerals of the latter. The clamping ring 20b associated with gas spring retainer assembly 1b is generally similar to the clamping ring 20 associated with previously described gas spring retainer assembly 1, except that the stop surfaces 45-48 of clamping ring 20b are configured differently than the stop surfaces 45b-48b of clamping ring 20. Furthermore, gas spring retainer assembly 1b includes a tapered plug 90 and a socket head cap screw type of mounting screw 91, instead of the tapered flat head screw 30 of gas spring retention assembly 1. More specifically, as best shown in FIGS. 21 and 22, the socket head cap screw 91 associated with gas spring retention assembly 1b has a conventional or standard shape, comprising a cylindrical head portion 92 with a tool socket 93 in the outer end or face thereof and a threaded shank 94. The head portion 92 of cap screw 91 has a flat, inner abutment surface 95 oriented generally perpendicular to the central axis of the shank portion 94. The threaded shank 94 of the illustrated cap screw 91 has a self-locking nylon patch 96 which serves to retain the mounting screw 96 tight in the associated die member, at least when clamping ring 20b is in the clamped condition.

The tapered plug 90 associated with gas spring retention assembly 1b has a central aperture 100 in which the shank portion 94 of cap screw 91 is received, and a tapered exterior wall 101 with at least a portion thereof having an outside diameter that is greater than the actuator space 26b between the hook-shaped end portion 24b of clamping ring 20b and the resilient free end portion 25b of clamping ring 20b. In the illustrated example, tapered plug 90 has a generally cylindrically shaped inner collar portion 102 that is contiguous with and blends into tapered wall 101, which is disposed at the outer side of tapered plug 90. Tapered plug 90 has generally flat, mutually parallel upper and lower faces 103 and 104, respectively, which are oriented generally perpendicular to the central axis of tapered plug 90. As best illustrated in FIGS. 25 and 27, tapered plug 90 has a circular plan shape, and is sized to be received in the actuator space 26b between the hook-shaped end portion 24b and free end portion 24b of clamping ring 20b. More specifically, all of the collar portion 102 of tapered plug 90, and at least a portion of the tapered wall portion 101 of tapered plug 90 are received in actuator space 26b. The upper face 103 of tapered plug 90 is configured to abut with the inner surface 95 of cap screw 90, and the lower surface 104 of tapered plug 90 is configured to abut the outer surface 16b of the associated die member 15b when clamping ring 20b is in the clamped condition, as shown in FIG. 27. The bottoming out or abutment between the lower face 104 of tapered plug 90 and the outer surface 16b of die member 15b serves to positively limit the constriction of the clamping portion 23b of clamping ring 20b about the gas spring body 7b. The tightening of cap screw 91 into the associated die member 15b engages the lower surface 95 of cap screw 91 against the upper face 103 of tapered plug 90, and thereby draws the same toward the outer surface 16b of the associated die member 15b. The tapered exterior wall 101 of tapered plug 90 thereby engages the hook shaped end portion 24b of clamping ring 20b and shifts the same radially and outwardly from the second axis of symmetry 22b, thereby pulling the clamping portion 23b of clamping ring 20b constrictingly against the gas spring body 7b. The tightening of cap screw 91 also engages the tapered exterior wall 101 of tapered plug 90 against the resilient free end portion 25b of clamping ring 20b and shifts the same radially inwardly from the second axis of symmetry 22 toward the first axis of symmetry 21, thereby further pulling clamping ring 20b constrictingly against the gas spring body 7b. Finally, the tightening of cap screw 91 also contemporaneously attaches the gas spring retainer assembly 1b and the gas spring 6b retained therein to the associated die member 15b in a secure, yet detachable manner.

As will be appreciated by those skilled in the art, clamping rings 20, 20a and 20b can be used with different types of mounting screw mechanisms. For example, the flat head mounting screw 30 shown in FIGS. 1-18 could be used with the clamping ring 20b shown in FIGS. 21-27, although the same might not be advantageous for all applications. Similarly, the tapered plug 90 and cap head screw 91 shown in FIGS. 20-27 could be used with the clamping ring 20 shown in FIGS. 1-18, although the same might not be advantageous for all applications.

Each of the gas spring retention assemblies 1-1b provides a less expensive, more economical mechanism for retaining gas springs and similar reaction devices in an associated metal forming die or die component. The gas spring retention assemblies 1-1b have a solid metal construction that is very durable, and is compatible with a wide variety of different sizes and configurations of gas springs, and also permits quick and easy assembly. Gas spring retention assemblies 1-1b greatly reduce the amount of machining associated with the mounting of the gas springs, and provides very secure circumferential clamping on the cylinder body without damaging the same.

The clamping rings 20-20b can be economically manufactured from a solid, flat plate of metal or the like and formed in a nested configuration to reduce material costs. Conventional flat head cap screws and standard socket head cap screws with the tapered plug embodiment can be used to reduce cost and tool room inventory. The tapered plug embodiment provides consistent clamping and protection from overtightening of the clamping ring.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. In a metal forming die of the type having at least one gas spring mounted between first and second reciprocating die members, the improvement of a gas spring retainer assembly, comprising:
   a one-piece, split clamping ring having a generally ovate plan shape with first and second spaced apart axes of symmetry, and defined by:
      a generally circular, resilient clamping portion disposed generally about said first axis of symmetry and shaped to receive a body portion of said gas spring body therein;
      a hook shaped end portion disposed generally about said second axis of symmetry and shaped to receive a fastener therein for attaching said clamping ring to said first die member;
      a resilient free end portion positioned operably between said clamping portion and said hook shaped end portion, and spaced radially from said second axis of symmetry to define an actuator space between said resilient free end portion and said hook shaped end portion; and
      a mounting screw having a threaded shank portion configured for anchoring in said first die member and a tapered head portion with at least a portion thereof having an outside diameter that is greater than said actuator space between said hook shaped end portion of said clamping ring and said resilient free end portion of said clamping ring, whereby tightening of said mounting screw into said first die member engages said tapered head portion of said mounting screw against said hook shaped end portion of said clamping ring and shifts the same radially outwardly away from said second axis of symmetry thereby pulling said clamping portion of said clamping ring constrictingly against said gas spring body, engages said tapered head portion of said mounting screw against said resilient free end portion of said clamping ring and shifts the same radially inwardly away from said second axis of symmetry and toward said first axis of symmetry, thereby further pulling said clamping ring constrictingly against said gas spring body, and securely, yet detachably, attaches said gas spring retainer assembly and said gas spring retained therein to said first die member.

2. A metal forming die as set forth in claim 1, wherein:
said tapered head portion of said mounting screw is configured such that when said mounting screw is loosely retained in said first die member, said clamping ring assumes a relaxed condition in which said gas spring body can be freely inserted into and removed from said clamping portion of said clamping ring, and when said mounting screw is tightly anchored in said first die member, said clamping ring assumes a clamped condition in which said gas spring body is securely retained in said clamping portion of said clamping ring.

3. A metal forming die as set forth in claim 2, wherein:
said resilient free end portion of said clamping ring has a generally L-shaped plan configuration defined by a first leg positioned operably between said clamping portion and said hook shaped end portion, and a second leg extending outwardly of said first leg to a location spaced apart from said hook shaped end portion and forming a space therebetween.

4. A metal forming die as set forth in claim 3, wherein:
said hook shaped end portion of said clamping ring includes a first stop surface which abuts a second stop surface on said second leg of said resilient free end portion of said clamping ring when said mounting screw is tightened to said clamped condition, and thereby positively limits the constriction of said clamping portion of said clamping ring about said gas spring body.

5. A metal forming die as set forth in claim 4, wherein:
said first leg of said resilient free end portion of said clamping ring includes a third stop surface which abuts a fourth stop surface on said clamping portion of said clamping ring when said mounting screw is tightened to said clamped condition, and thereby positively limits the constriction of said clamping portion of said clamping ring about said gas spring body.

6. A metal forming die as set forth in claim 5, wherein:
said clamping ring is configured such that contact between said tapered head portion of said mounting screw and said hook shaped end portion of said clamping ring occurs at a single point to facilitate shifting said clamping ring between said clamped condition and said relaxed condition.

7. A metal forming die as set forth in claim 6, wherein:
said clamping ring is configured such that contact between said tapered head portion of said mounting screw and said resilient free end portion of said clamping ring occurs at a single point to facilitate shifting said clamping ring between said clamped condition and said relaxed condition.

8. A metal forming die as set forth in claim 7, wherein:
said clamping portion of said clamping ring includes an inner marginal sidewall surface having a generally circular plan shape in said relaxed condition configured to closely receive said gas spring body therein, whereby when said mounting screw is tightened to said clamped condition, said inner marginal sidewall of said clamping portion abuttingly clamps constricting about at least portions of the circumference of said gas spring body to both center and securely, yet releasably, retain the same therein.

9. A metal forming die as set forth in claim 8, wherein:
said clamping portion of said clamping ring has a resilient and elastically deformable construction, whereby in said clamped condition, said inner marginal sidewall of said clamping ring assumes a non-circular plan shape defined by a plurality of circumferentially spaced apart contact surfaces abutting said gas spring body, and a plurality of non-contact surfaces disposed circumferentially in between said contact surfaces, whereby when said mounting screw is tightened to said clamped condition, those portions of said clamping ring associated with said non-contact surfaces resiliently tense longitudinally and draw said contact surfaces abuttingly against said gas spring body to securely, yet releasably, retain said gas spring body in said clamping ring.

10. A metal forming die as set forth in claim 9, including:
a blind hole pocket disposed in a first face of said first die member and having a cylindrically shaped sidewall closely receiving said gas spring body therein and a bottom abuttingly supporting an end portion of said gas spring thereon.

11. A metal forming die as set forth in claim 10, wherein:
said clamping ring is positioned abuttingly on top of said first face of said first die member at a location generally overlying said blind hole pocket to minimize machining of said first die member.

12. A retainer assembly for mounting gas springs in metal forming dies, comprising:
a one-piece, split clamping ring having a generally ovate plan shape with first and second spaced apart axes of symmetry, and defined by:
  a generally circular clamping portion disposed generally about said first axis of symmetry and shaped to receive a gas spring body therein;
  a hook shaped end portion disposed generally about said second axis of symmetry and shaped to receive a fastener therein for attaching said clamping ring to an associated metal forming die member;
  a resilient free end portion positioned operably between said clamping portion and said hook shaped end portion, and spaced radially from said second axis of symmetry to define an actuator space between said resilient free end portion and said hook shaped end portion; and
  a mounting screw having a threaded shank portion configured for anchoring in the metal forming die member and a tapered head portion with at least a portion thereof having an outside diameter that is greater than said actuator space between said hook shaped end portion of said clamping ring and said resilient free end portion of said clamping ring, whereby tightening of said mounting screw into the associated metal forming die member engages said tapered head portion of said mounting screw against said hook shaped end portion of said clamping ring and shifts the same radially outwardly away from said second axis of symmetry thereby pulling said clamping portion of said clamping ring constrictingly against the gas spring body, engages said tapered head portion of said mounting screw against said resilient free end portion of said clamping ring and shifts the same radially inwardly away from said second axis of symmetry and toward said first axis of symmetry, thereby further pulling said clamping ring constrictingly against the gas spring body, and securely, yet detachably, attaches said gas spring retainer assembly and the gas spring retained therein to the associated metal forming die member.

13. A retainer assembly as set forth in claim 12, wherein:
said tapered head portion of said mounting screw is configured such that when said mounting screw is loosely retained in the associated metal forming die member, said clamping ring assumes a relaxed condition in which the gas spring body can be freely inserted into and removed from said clamping portion of said clamping ring, and when said mounting screw is tightly anchored in the associated metal forming die member, said clamping ring assumes a clamped condition in which the gas spring body is securely retained in said clamping portion of said clamping ring.

14. A retainer assembly as set forth in claim 13, wherein:
said resilient free end portion of said clamping ring has a generally L-shaped plan configuration defined by a first leg positioned operably between said clamping portion and said hook shaped end portion, and a second leg extending outwardly of said first leg to a location spaced apart from said hook shaped end portion and forming a space therebetween.

15. A retainer assembly as set forth in claim 14, wherein:
said hook shaped end portion of said clamping ring includes a first stop surface which abuts a second stop surface on said second leg of said resilient free end portion of said clamping ring when said mounting screw is tightened to said clamped condition, and thereby positively limits the constriction of said clamping portion of said clamping ring about the gas spring body.

16. A retainer assembly as set forth in claim 15, wherein:
said first leg of said resilient free end portion of said clamping ring includes a third stop surface which abuts a fourth stop surface on said clamping portion of said clamping ring when said mounting screw is tightened to said clamped condition, and thereby positively limits the constriction of said clamping portion of said clamping ring about the gas spring body.

17. A retainer assembly as set forth in claim 16, wherein:
said clamping ring has generally flat, mutually parallel and oppositely disposed first and second outer surfaces; and
said hook shaped end portion of said clamping ring has an inner marginal sidewall surface oriented generally perpendicular to said first and second outer surfaces.

18. A retainer assembly as set forth in claim 17, wherein:
said clamping ring is configured such that contact between said tapered head portion of said mounting screw and said hook shaped end portion of said clamping ring occurs at a single point to facilitate shifting said clamping ring to said clamped condition.

19. A retainer assembly as set forth in claim 18, wherein:
said first leg of said resilient free end portion of said clamping ring has an outer marginal sidewall surface oriented generally perpendicular to said first and second outer surfaces; and
said clamping ring is configured such that contact between said tapered head portion of said mounting screw and said resilient free end portion of said clamping ring occurs at a single point to facilitate shifting said clamping ring to said clamped condition.

20. A retainer assembly as set forth in claim 19, wherein:
said clamping portion of said clamping ring includes an inner marginal sidewall surface having a generally circular plan shape in said relaxed condition configured to closely receive the gas spring body therein, whereby when said mounting screw is tightened to said clamped condition, said inner marginal sidewall of said clamping portion abuttingly clamps constricting about at least portions of the circumference of the gas spring body to both center and securely, yet releasably, retain the same therein.

21. A retainer assembly as set forth in claim 20, wherein:
said clamping portion of said clamping ring has a resilient and elastically deformable construction, whereby in said clamped condition said inner marginal sidewall of said clamping ring assumes a non-circular plan shape defined by a plurality of circumferentially spaced apart contact surfaces abutting the gas spring body, and a plurality of non-contact surfaces disposed circumferentially in between said contact surfaces, whereby when said mounting screw is tightened to said clamped condition, those portions of said clamping ring associated with said non-contact surfaces resiliently tense longitudinally and draw said contact surfaces abuttingly against the gas spring body to securely, yet releasably, retain the gas spring body in said clamping ring.

22. A retainer assembly as set forth in claim 21, wherein:
said hook shaped end portion of said clamping ring includes an outwardly protruding first stop arm extending radially away from said second axis of symmetry and defining at least a portion of said first stop surface; and
said second leg of said resilient free end portion of said clamping ring includes a channel opening radially toward said second axis of symmetry and defining at least a portion of said second stop surface, and receiving said stop arm therein, whereby tightening of said mounting screw resiliently shifts said first and second stop surfaces into abutting engagement.

23. A retainer assembly as set forth in claim 22, wherein:
said clamping portion of said clamping ring includes an inwardly protruding second stop arm defining at least a portion of said fourth stop surface; and
said resilient free end portion of said clamping ring includes a terminal portion with a radially inwardly oriented face defining at least a portion of said third stop surface, whereby tightening of said mounting screw resiliently shifts said third and fourth stop surfaces into abutting engagement.

24. A retainer assembly as set forth in claim 23, wherein:
said shank portion of said mounting screw includes a self-locking element.

25. A retainer assembly as set forth in claim 24, wherein:
said mounting screw comprises a conventional flat head cap screw.

26. A retainer assembly as set forth in claim 12, wherein:
said hook shaped end portion of said clamping ring includes a first stop surface which abuts a second stop surface on said resilient free end portion of said clamping ring when said mounting screw is tightened to said clamped condition, and thereby positively limits the constriction of said clamping portion of said clamping ring about the gas spring body.

27. A retainer assembly as set forth in claim 12, wherein:
said resilient free end portion of said clamping ring includes a third stop surface which abuts a fourth stop surface on said clamping portion of said clamping ring when said mounting screw is tightened to said clamped condition, and thereby positively limits the constriction of said clamping portion of said clamping ring about the gas spring body.

28. A retainer assembly as set forth in claim 12, wherein:
said clamping ring has generally flat, mutually parallel and oppositely disposed first and second outer surfaces; and
said hook shaped end portion of said clamping ring has an inner marginal sidewall surface oriented generally perpendicular to said first and second outer surfaces.

29. A retainer assembly as set forth in claim 12, wherein:
said clamping ring is configured such that contact between said tapered head portion of said mounting screw and said hook shaped end portion of said clamping ring occurs at a single point to facilitate shifting said clamping ring to said clamped condition.

30. A retainer assembly as set forth in claim 12, wherein:
said clamping ring is configured such that contact between said tapered head portion of said mounting screw and said resilient free end portion of said clamping ring occurs at a single point to facilitate shifting said clamping ring to said clamped condition.

31. A retainer assembly as set forth in claim 12, wherein:
said clamping portion of said clamping ring includes an inner marginal sidewall surface having a generally circular plan shape configured to closely receive a gas spring body therein, whereby when said mounting screw is tightened to said clamped condition, said inner marginal sidewall of said clamping portion abuttingly clamps constricting about a major portion of the circumference of the gas spring body to both a center and securely, yet releasably, retain the same therein.

32. A retainer assembly as set forth in claim 12, wherein:
said clamping ring is cut from a flat plate of metal.

33. In a metal forming die of the type having at least one gas spring mounted between first and second reciprocating die members, the improvement of a gas spring retainer assembly comprising:
a one-piece, split clamping ring having a generally ovate plan shape with first and second spaced apart axes of symmetry, and defined by:
a generally circular clamping portion disposed generally about said first axis of symmetry and shaped to receive a body portion of said gas spring therein;
a hook shaped end portion disposed generally about said second axis of symmetry and shaped to receive a fastener therein for attaching said clamping ring to said first die member;
a resilient free end portion positioned operably between said clamping portion and said hook shaped end portion, and spaced radially from said second axis of symmetry to define an actuator space between said resilient free end portion and said hook shaped end portion;
a mounting screw having a threaded shank portion configured for anchoring in said first die member and an enlarged head portion; and
a tapered plug having a central aperture in which said shank portion of said mounting screw is retained, and a tapered exterior wall with at least a portion thereof having an outside diameter that is greater than said actuator space between said hook shaped end portion of said clamping ring and said resilient free end portion of said clamping ring, whereby tightening of said mounting screw into said first die member engages said head portion of said mounting screw against said tapered plug and draws the same toward said first die member, which engages said tapered exterior wall of said tapered plug against said hook shaped end portion of said clamping ring and shifts the same radially outwardly away from said second axis of symmetry thereby pulling said clamping portion of said clamping ring constrictingly against said gas spring body, engages said tapered exterior wall of said tapered plug against said resilient free end portion of said clamping ring and shifts the same radially inwardly away from said second axis of symmetry and toward said first axis of symmetry, thereby further pulling said clamping ring constrictingly against said gas spring body, and securely, yet detachably, attaches said gas spring retainer assembly and said gas spring retained therein to said first die member.

34. A metal forming die as set forth in claim 33, wherein:
said tapered exterior wall of said tapered plug is configured such that when said mounting screw is loosely retained in said first die member, said clamping ring assumes a relaxed condition in which said gas spring body can be freely inserted into and removed from said clamping portion of said clamping ring, and when said mounting screw is tightly anchored in said first die member, said clamping ring assumes a clamped condition in which the gas spring body is securely retained in said clamping portion of said clamping ring.

35. A metal forming die as set forth in claim 34, wherein:
said resilient free end portion of said clamping ring has a generally L-shaped plan configuration defined by a first leg positioned operably between said clamping portion and said hook shaped end portion, and a second leg extending outwardly of said first leg to a location spaced apart from said hook shaped end portion and forming a space therebetween.

36. A metal forming die as set forth in claim 35, wherein:
said hook shaped end portion of said clamping ring includes a first stop surface which abuts a second stop surface on said second leg of said resilient free end portion of said clamping portion of said clamping ring when said mounting screw is tightened to said clamped condition, and thereby positively limits the constriction of said clamping portion of said clamping ring about said gas spring body.

37. A metal forming die as set forth in claim 36, wherein:
said first leg of said resilient free end portion of said clamping ring includes a third stop surface which abuts a fourth stop surface on said clamping portion of said clamping ring about said gas spring body.

38. A metal forming die as set forth in claim 37, wherein:
said clamping portion of said clamping ring includes an inner marginal sidewall surface having a generally circular plan shape in said related condition configured to closely receive the gas spring body therein, whereby when said mounting screw is tightened to said clamped condition, said inner marginal sidewall of said clamping portion abuttingly clamps constricting about at least portions of the circumference of the gas spring body to both center and securely, yet releasably, retain the same therein.

39. A metal forming die as set forth in claim 38, wherein:
said clamping portion of said clamping ring has a resilient and elastically deformable construction, whereby in said clamped condition said inner marginal sidewall of said clamping ring assumes a non-circular plan shape defined by a plurality of circumferentially spaced apart contact surfaces abutting said gas spring body, and a plurality of non-contact surfaces disposed circumferentially in between said contact surfaces, whereby when said mounting screw is tightened to said clamped condition, those portions of said clamping ring associated with said non-contact surfaces resiliently tense longitudinally and draw said contact surfaces abuttingly against said gas spring body to securely, yet releasably, retain said gas spring body in said clamping ring.

40. A metal forming die as set forth in claim 39, including:
a blind hole pocket disposed in a first face of said first die member and having a sidewall closely receiving said gas spring body therein and a bottom abuttingly supporting an end portion of said gas spring thereon.

41. A metal forming die as set forth in claim 40, wherein:
said clamping ring is positioned abuttingly on top of said first face of said first die member at a location generally overlying said blind hole pocket to minimize machining of said first die member.

42. A retainer assembly for mounting gas springs in metal forming dies, comprising:
a one-piece, split clamping ring having a generally ovate plan shape with first and second spaced apart axes of symmetry, and defined by:
a generally circular clamping portion disposed generally about said first axis of symmetry and shaped to receive a gas spring body therein;
a hook shaped end portion disposed generally about said second axis of symmetry and shaped to receive a fastener therein for attaching said clamping ring to an associated metal forming die member;
a resilient free end portion positioned operably between said clamping portion and said hook shaped end portion, and spaced radially from said second axis of symmetry to define an actuator space between said resilient free end portion and said hook shaped end portion;
a mounting screw having a threaded shank portion configured for anchoring in the metal forming die member and an enlarged head portion; and
a tapered plug having a central aperture in which said shank portion of said mounting screw is retained, and a tapered exterior wall with at least a portion thereof having an outside diameter that is greater than said actuator space between said hook shaped end portion of said clamping ring and said resilient free end portion of said clamping ring, whereby tightening of said mounting screw into the associated metal forming die member engages said head portion of said mounting screw against said tapered plug and draws the same toward the associated metal forming die member, which engages said tapered exterior wall of said tapered plug against said hook shaped end portion of said clamping ring and shifts the same radially outwardly away from said second axis of symmetry thereby pulling said clamping portion of said clamping ring constrictingly against the gas spring body, engages said tapered exterior wall of said tapered plug against said resilient free end portion of said clamping ring and shifts the same radially inwardly away from said second axis of symmetry and toward said first axis of symmetry, thereby further pulling said clamping ring constrictingly against the gas spring body, and securely, yet detachably, attaches said gas spring retainer assembly and the gas spring retained therein to the associated metal forming die member.

43. A retainer assembly as set forth in claim 42, wherein:
said tapered exterior wall of said tapered plug is configured such that when said mounting screw is loosely retained in the associated metal forming die member, said clamping ring assumes a relaxed condition in which the gas spring body can be freely inserted into and removed from said clamping portion of said clamping ring, and when said mounting screw is tightly anchored in the associated metal forming die member, said clamping ring assumes a clamped condition in which the gas spring body is securely retained in said clamping portion of said clamping ring.

44. A retainer assembly as set forth in claim 43, wherein:
said resilient free end portion of said clamping ring has a generally L-shaped plan configuration defined by a first leg positioned operably between said clamping portion and said hook shaped end portion, and a second leg extending outwardly of said first leg to a location spaced apart from said hook shaped end portion and forming a space therebetween.

45. A retainer assembly as set forth in claim 44, wherein:
said hook shaped end portion of said clamping ring includes a first stop surface which abuts a second stop surface on said second leg of said resilient free end portion of said clamping portion of said clamping ring when said mounting screw is tightened to said clamped condition, and thereby positively limits the constriction of said clamping portion of said clamping ring about the gas spring body.

46. A retainer assembly as set forth in claim 45, wherein:
said first leg of said resilient free end portion of said clamping ring includes a third stop surface which abuts a fourth stop surface on said clamping portion of said clamping ring when said mounting screw is tightened to said clamped condition, and thereby positively limits the constriction of said clamping portion of said clamping ring about the gas spring body.

47. A retainer assembly, as set forth in claim 46, wherein:
said clamping portion of said clamping ring includes an inner marginal sidewall surface having a generally circular plan shape in said relaxed condition configured to closely receive the gas spring body therein, whereby when said mounting screw is tightened to said clamped condition, said inner marginal sidewall of said clamping portion abuttingly clamps constrictingly about at least portions of the circumference of the gas spring body to both center and securely, yet releasably, retain the same therein.

48. A retainer assembly as set forth in claim 47, wherein:
said clamping portion of said clamping ring has a resilient and elastically deformable construction, whereby in said clamped condition said inner marginal sidewall of said clamping ring assumes a non-circular plan shape defined by a plurality of circumferentially spaced apart contact surfaces abutting the gas spring body, and a plurality of non-contact surfaces disposed circumferentially in between said contact surfaces, whereby when said mounting screw is tightened to said clamped condition, those portions of said clamping ring associated with said non-contact surfaces resiliently tense longitudinally and draw said contact surfaces abuttingly against the gas spring body to securely, yet releasably, retaining the gas spring body in said clamping ring.

49. In a method for making a metal forming die of the type having at least one gas spring mounted between first and second reciprocating die members, the improvement comprising:
forming a blind hole pocket in the first die member with a sidewall shaped for close reception of the body portion of the gas spring therein, and a bottom on which an end portion of the gas spring is abuttingly supported;
forming a threaded retainer aperture in the first die member at a location spaced laterally apart from the blind hole pocket a predetermined distance, and oriented generally parallel therewith;
forming a one-piece, split clamping ring with a generally ovate plan shape having first and second spaced apart axes of symmetry, and a generally circular, resilient clamping portion disposed generally about the first axis of symmetry and shaped to receive the gas spring body therein, a hook shaped end portion disposed generally about the second axis of symmetry and shaped to receive a fastener therein for attaching the clamping ring to the first die member, and a resilient free end portion positioned operably between the clamping portion and the hook shaped end portion, and spaced radially from the second axis of symmetry to define an actuator space between the resilient free end portion and the hook shaped end portion;
providing a mounting screw having a threaded shank portion configured for anchoring in the first die member and a tapered head portion with at least a portion thereof having an outside diameter that is greater than the actuator space between the hook shaped end portion of the clamping ring and the resilient free end portion of said clamping ring;
positioning the clamping ring on the first die member with the clamping portion thereof disposed generally over the blind hole pocket, and the hook shaped end portion thereof disposed generally over the threaded retainer aperture in the first die member;
inserting the mounting screw through the hook shaped end portion of the clamping ring and into the threaded retainer aperture in the first die member, and rotating the same to a loosely retained condition;
inserting the body portion of the gas spring through the clamping portion of the clamping ring and into the blind hole pocket in the first die member; and
tightening the mounting screw in the threaded retainer aperture of the first die member, thereby engaging the tapered head portion of the mounting screw against the hook shaped end portion of the clamping ring and shifting the same radially outwardly away from the second axis of symmetry thereby pulling the clamping portion of the clamping ring constrictingly against the gas spring body, engaging the tapered head portion of the mounting screw against the resilient free end portion of the clamping ring and shifting the same radially inwardly away from the second axis of symmetry and toward the first axis of symmetry, thereby further pulling the clamping ring constrictingly against the gas spring body, and securely, yet detachably, attaching the gas spring retainer assembly and the gas spring retained therein to the first die member.

50. A method as set forth in claim 49, wherein:
said clamping ring forming step comprises cutting the clamping ring from a flat plate of metal.

51. A method as set forth in claim 50, wherein:
said clamping ring forming step includes:
forming a first stop surface on the hook shaped end portion of the clamping ring; and
forming a second stop surface on the second leg of the resilient free end portion of the clamping ring positioned to abut the first stop surface when the mounting screw is tightened to a clamped condition to positively limit the constriction of the clamping portion of the clamping ring about the gas spring body.

52. A method as set forth in claim 51, wherein:
said clamping ring forming step further includes:
forming a third stop surface on the first leg of the resilient free end portion of the clamping ring; and
forming a fourth stop surface on the clamping portion of the clamping ring positioned to abut the third stop surface when the mounting screw is tightened to said clamped condition to positively limit the constriction of the clamping portion of the clamping ring about the gas spring body.

53. In a method for making a metal forming die of the type having at least one gas spring mounted between first and second reciprocating die members, the improvement comprising:

forming a blind hole pocket in the first die member with a sidewall shaped for close reception of the body portion of the gas spring therein, and a bottom on which an end portion of the gas spring is abuttingly supported;

forming a threaded retainer aperture in the first die member at a location spaced laterally apart from the blind hole pocket a predetermined distance, and oriented generally parallel therewith;

forming a one-piece, split clamping ring with a generally ovate plan shape having first and second spaced apart axes of symmetry, and a generally circular, resilient clamping portion disposed generally about the first axis of symmetry and shaped to receive the gas spring body therein, a hook shaped end portion disposed generally about the second axis of symmetry and shaped to receive a fastener therein for attaching the clamping ring to the first die member, and a resilient free end portion positioned operably between the clamping portion and the hook shaped end portion, and spaced radially from the second axis of symmetry to define an actuator space between the resilient free end portion and the hook shaped end portion;

providing a mounting screw having a threaded shank portion configured for anchoring in the first die member and an enlarged head portion;

forming a tapered plug having a central aperture in which the shank portion of the mounting screw is retained, and a tapered exterior wall with at least a portion thereof having an outside diameter that is greater than the actuator space between the hook shaped end portion of the clamping ring and the resilient free end portion of the clamping ring;

positioning the clamping ring on the first die member with the clamping portion thereof disposed generally over the blind hole pocket, and the hook shaped end portion thereof disposed generally over the threaded retainer aperture in the first die member;

inserting the tapered plug into the hook shaped end portion of the clamping ring;

inserting the mounting screw through the central aperture of the tapered plug and into the threaded retainer aperture in the first die member, and rotating the same to a loosely retained condition;

inserting the body portion of the gas spring through the clamping portion of the clamping ring and into the blind hole pocket in the first die member; and tightening of the mounting screw in the threaded retainer aperture in the first die member thereby engaging the head portion of the mounting screw against the tapered plug and drawing the same toward the first die member thereby engaging the tapered exterior wall of the tapered plug against the hook shaped end portion of the clamping ring and shifting the same radially outwardly away from the second axis of symmetry thereby pulling the clamping portion of the clamping ring constrictingly against the gas spring body, engaging the tapered exterior wall of the tapered plug against the resilient free end portion of the clamping ring and shifting the same radially inwardly away from the second axis of symmetry and toward the first axis of symmetry, thereby further pulling the clamping ring constrictingly against the gas spring body, and securely, yet detachably, attaching the gas spring retainer assembly and the gas spring retained therein to the first die member.

* * * * *